(12) United States Patent
Shiouchi et al.

(10) Patent No.: US 8,190,186 B2
(45) Date of Patent: May 29, 2012

(54) WIRELESS COMMUNICATION SYSTEM, WEAK RADIO WAVE COMMUNICATION DEVICE, MOBILE TERMINAL DEVICE, BASE STATION DEVICE, AND PROGRAM

(75) Inventors: Masatoshi Shiouchi, Kawasaki (JP); Takao Mohri, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1041 days.

(21) Appl. No.: 11/953,947

(22) Filed: Dec. 11, 2007

(65) Prior Publication Data
US 2008/0146263 A1    Jun. 19, 2008

(30) Foreign Application Priority Data
Dec. 15, 2006  (JP) .................................. 2006-337833

(51) Int. Cl.
*H04W 40/00*    (2009.01)
*H04B 7/00*    (2006.01)

(52) U.S. Cl. ........ 455/517; 455/69; 455/458; 455/456.4
(58) Field of Classification Search .................. 455/517, 455/69, 522, 420, 452.2, 452.1, 458, 515, 455/68, 509, 456.4, 456.1, 414.2, 414.1, 455/464, 466; 370/338, 466, 328
See application file for complete search history.

(56) References Cited

U.S. PATENT DOCUMENTS

| | | | | |
|---|---|---|---|---|
| 7,773,570 B2 * | 8/2010 | Lee et al. | ...................... | 370/338 |
| 2007/0147299 A1 * | 6/2007 | Ando et al. | ................... | 370/331 |
| 2008/0112351 A1 * | 5/2008 | Surineni et al. | ............... | 370/312 |

FOREIGN PATENT DOCUMENTS

| | | |
|---|---|---|
| JP | 2004-297247 | 10/2004 |
| JP | 2005-123833 | 5/2005 |
| JP | 2006-80739 | 3/2006 |
| JP | 2006-324891 | 11/2006 |

OTHER PUBLICATIONS

Japanese Office Action issued on Apr. 14, 2009 in corresponding Japanese Patent Application 2006-337833.

* cited by examiner

*Primary Examiner* — John J Lee
(74) *Attorney, Agent, or Firm* — Staas & Halsey LLP

(57) ABSTRACT

In a communication system environment, access points which transmit/receive information by wireless communication, a mobile terminal which moves in a utilization environment and transmits/receives information by wireless communication, and a wireless tag of a weak radio wave which transmits/receives information by wireless communication of weak transmission power smaller than the transmission power of the access points and the mobile terminal are disposed. The mobile terminal transmits a special CTS frame including a MAC address, which cannot exist in the utilization environment, and transmission planned time upon communication with the wireless tag. The access points which have received the special CTS frame prohibit transmission operation for the transmission planned time in the frame, and, during that period, the wireless tag transmits position information or the like to the mobile terminal without being interrupted.

15 Claims, 32 Drawing Sheets

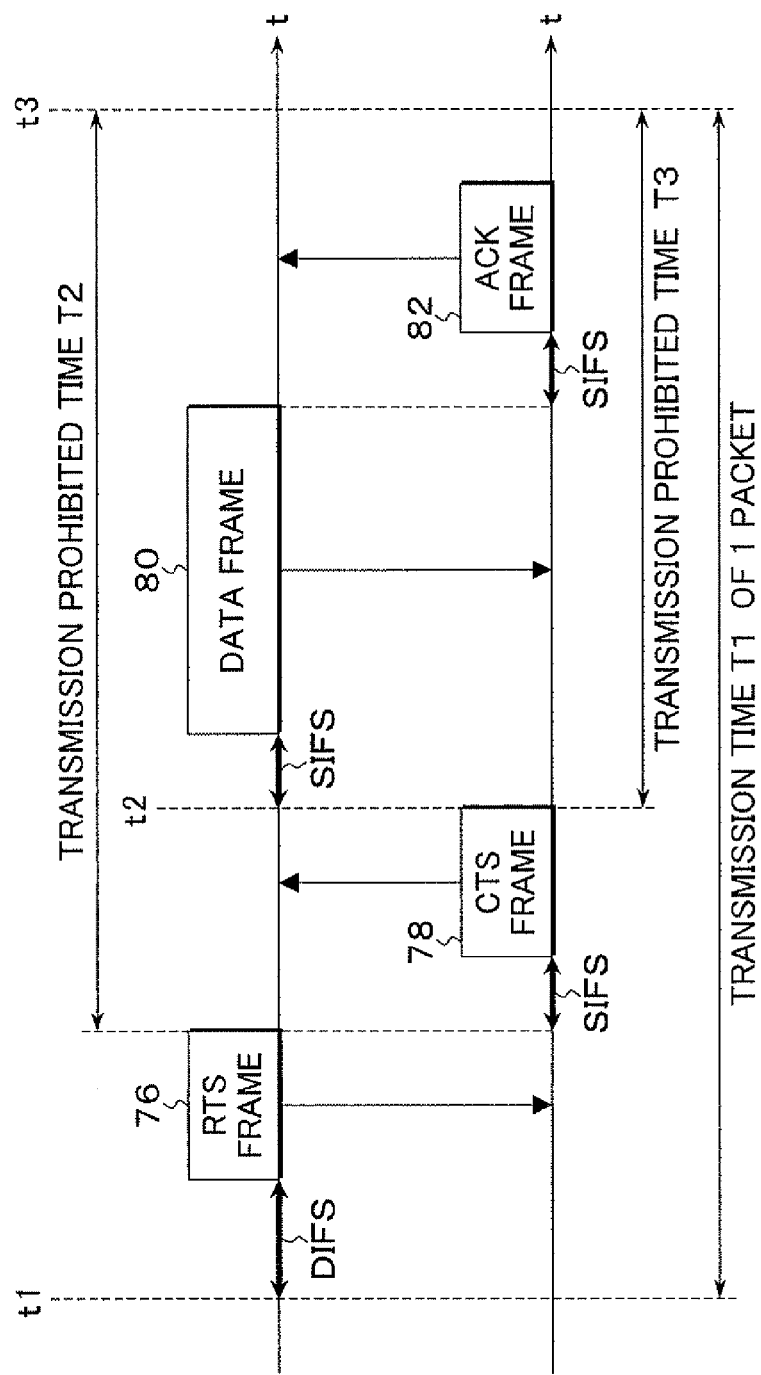

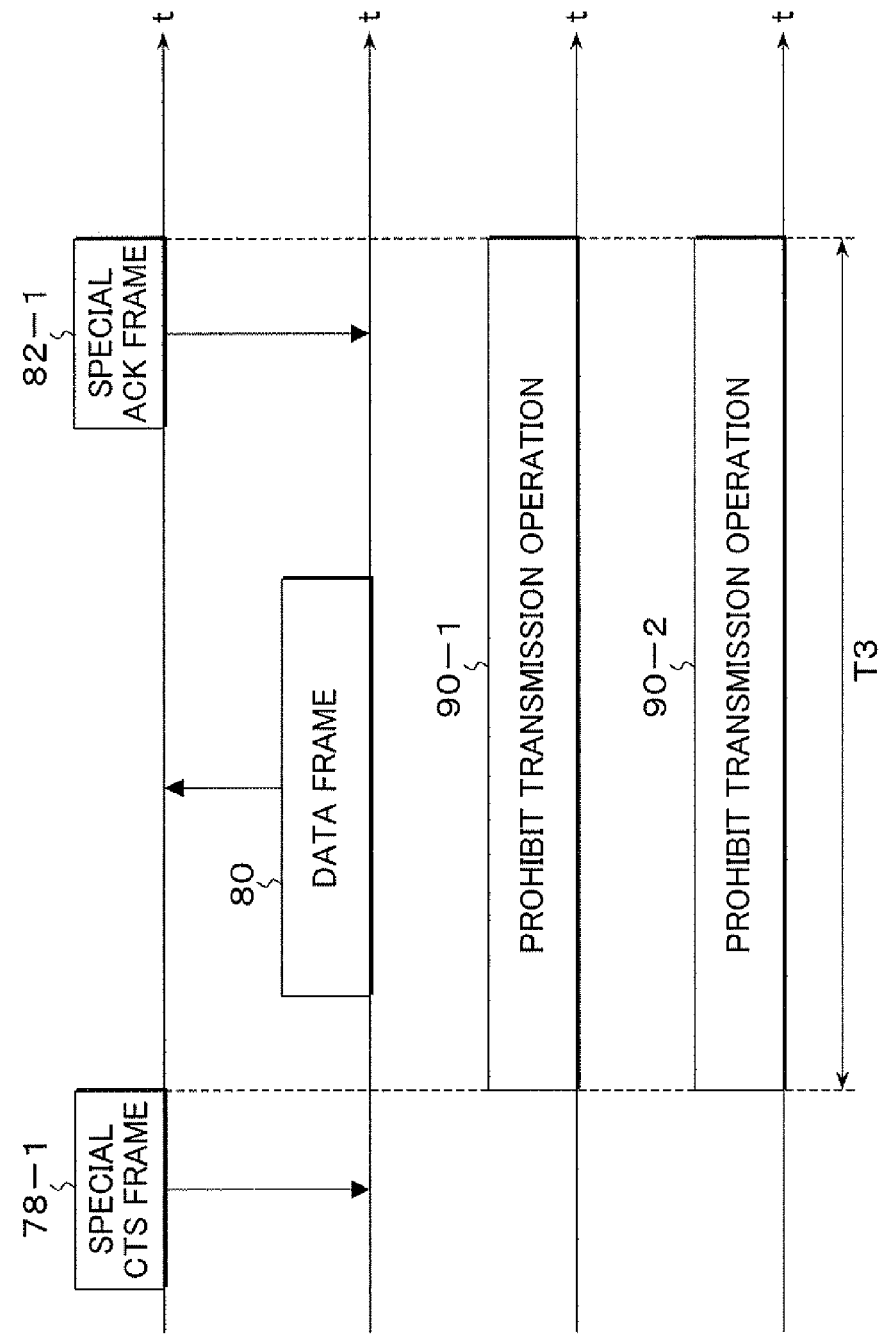

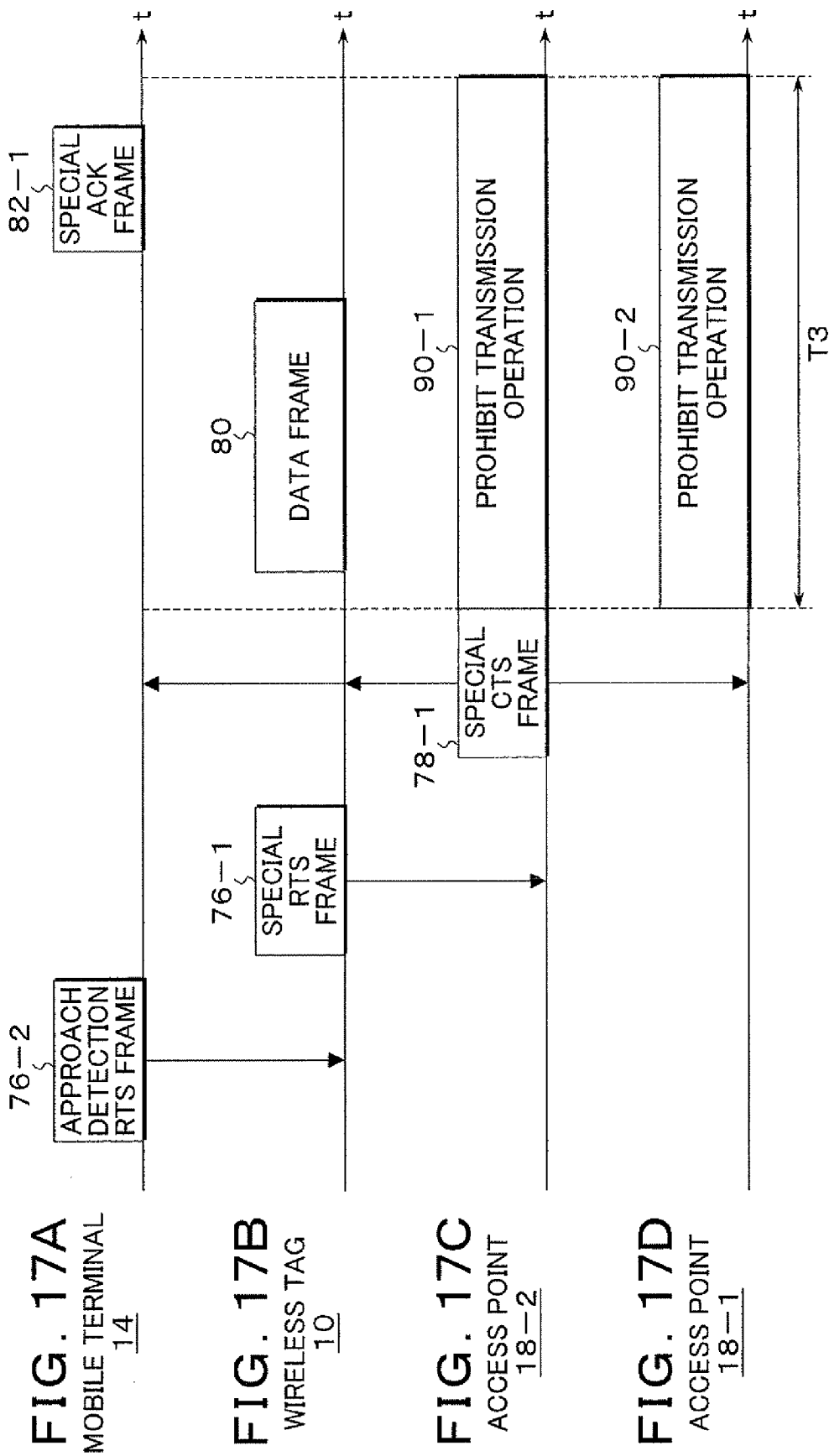

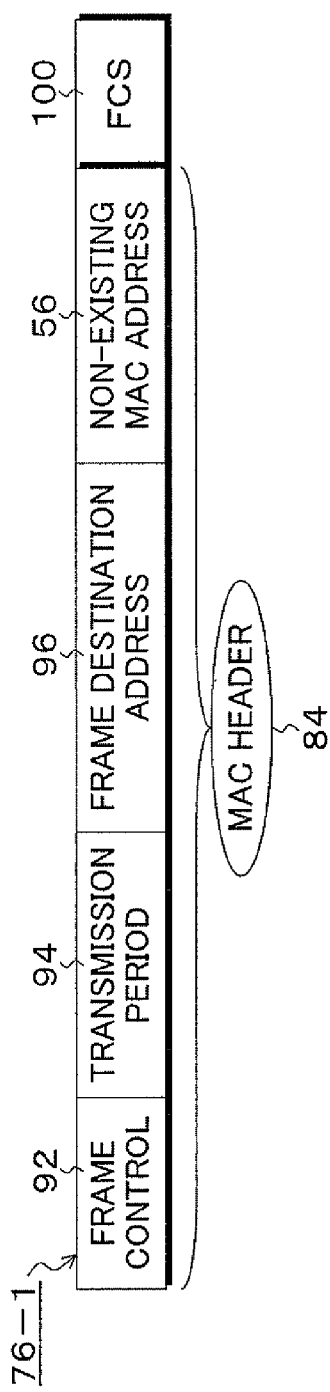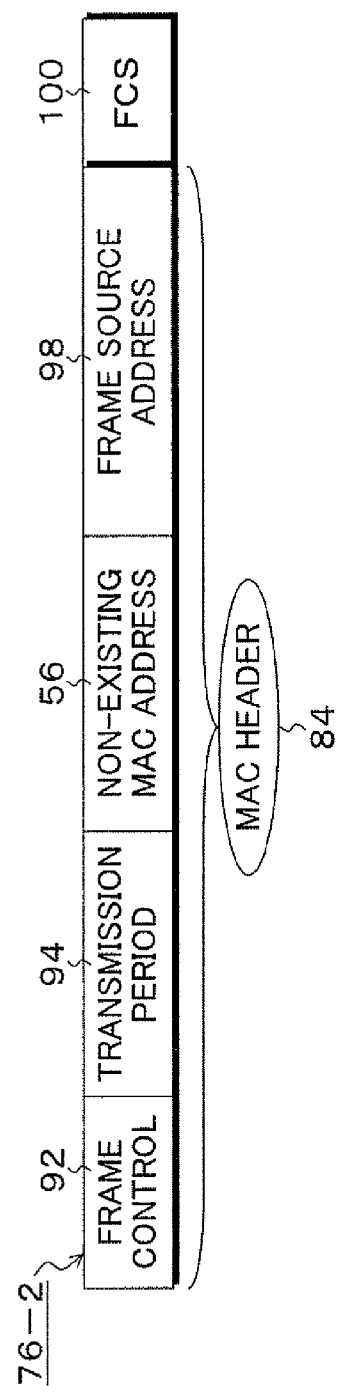

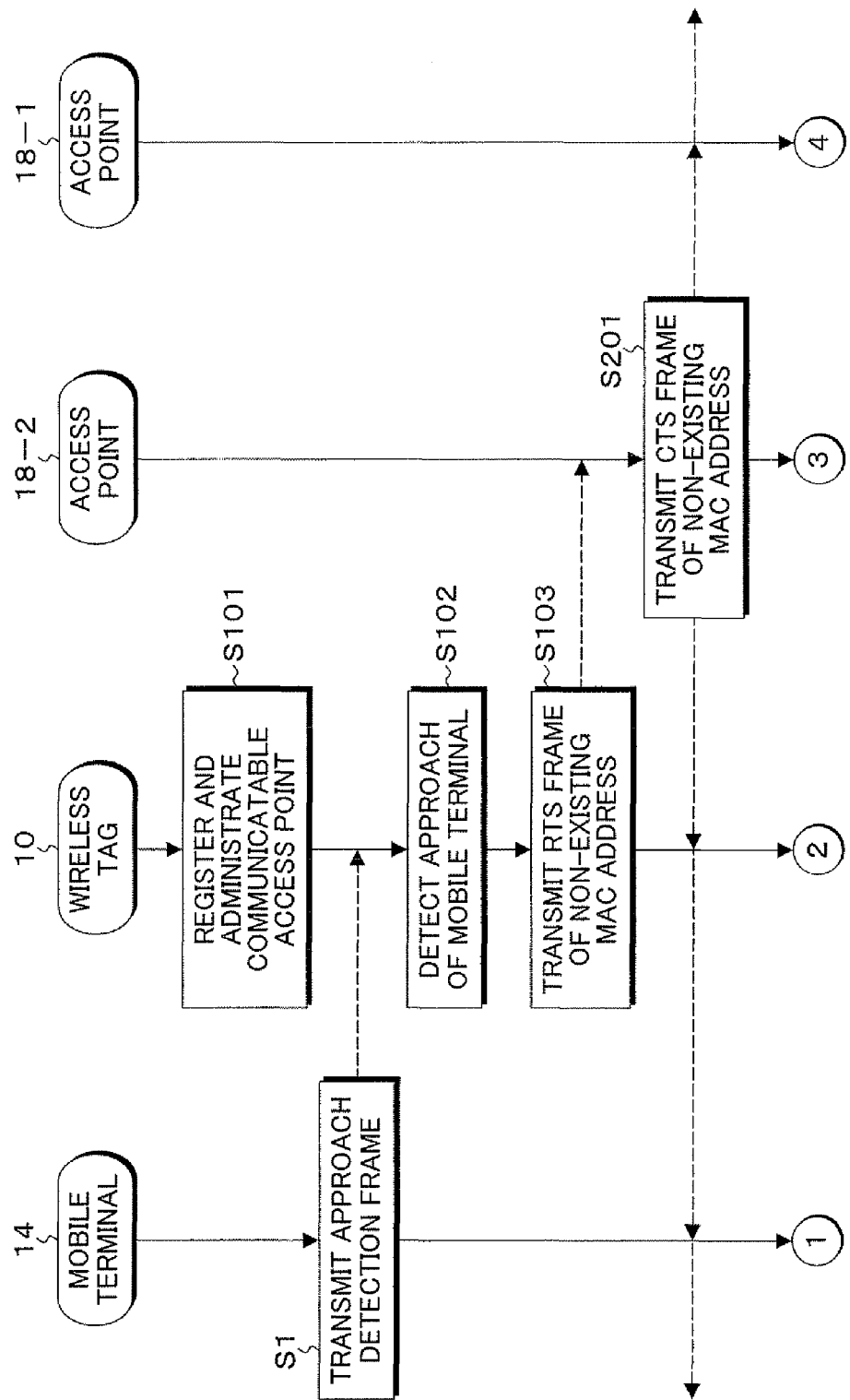

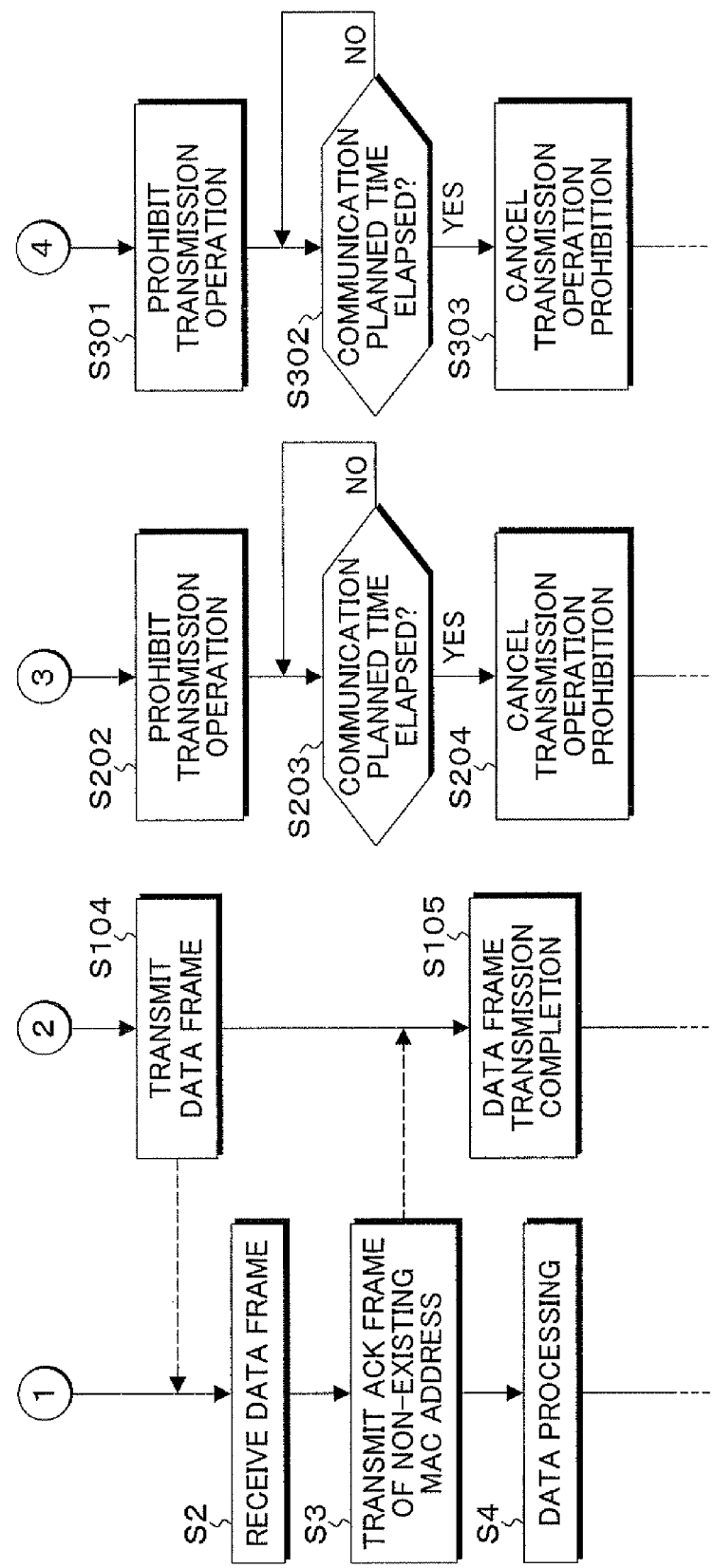

WIRELESS COMMUNICATION SYSTEM, WEAK RADIO WAVE COMMUNICATION DEVICE, MOBILE TERMINAL DEVICE, BASE STATION DEVICE, AND PROGRAM

This application is a priority based on prior applications No. JP 2006-337833, filed Dec. 15, 2006, in Japan.

BACKGROUND OF THE INVENTION

1. Field of the Invention

The present invention relates to a wireless communication system, weak radio wave communication device, mobile terminal device, base station device, and program which process data by transmitting the data from the weak radio wave communication device, for example, one of wireless tags disposed in a dispersed manner in a wireless LAN environment in which access points are installed, to the mobile terminal device such as a portable phone, and particularly relates to the wireless communication system, weak radio wave communication device, mobile terminal device, base station device, and program for reliably transmitting data to the mobile terminal device even by weak radio waves from the wireless tag.

2. Description of the Related Arts

Recently, there has been conceived a system in which wireless tags known as communication devices that transmit/receive data by weak radio waves are disposed at various locations, and, for example, position information is received from the wireless tags by a mobile terminal such as a portable phone so as to recognize that it is in the vicinity of the wireless tag. A communication module adapted for an IEEE 802.11 wireless local area network (hereinafter, referred to as "wireless LAN") is used as a communication module of such a wireless tag, a utilization environment in which access points serving as base stations of a wireless LAN, for example, a wireless LAN environment of, for example, a facility or a shop is built, and wireless tags are disposed therein in a dispersed manner so that position information or commercial product information can be transmitted to and utilized by a portable terminal which is carried by a user and on which a communication module adapted for the wireless LAN is mounted.

However, when the wireless tags that emit merely weak radio waves are disposed in a dispersed manner in a wireless LAN environment, the mobile terminal communicates with the access points, in addition to communication with the wireless tags, by strong radio waves by using a frequency band same as that of the wireless tags; therefore, there is a problem that the weak radio waves of the wireless tags are interrupted by the strong radio waves between the mobile terminal and the access points, and the signals from the wireless tags cannot be readily received. In such a case in which radio waves from a plurality of devices collide with each other, generally, mutual interference is avoided by a collision avoiding technique such as CSMA/CA (Carrier Sense Multiple Access/Collision Avoidance). CSMA/CA is a method in which the state of the surrounding area is monitored before emitting radio waves, transmission operation is started merely when no one is performing transmission, and, when someone is performing transmission, termination of the communication is waited for to try transmission again. However, in order to cause CSMA/CA to be effective, the radio waves of the wireless tags are required to reach all the access points and other mobile terminals, and there is a problem that it does not effectively function by the wireless tags that emit merely weak radio waves.

SUMMARY OF THE INVENTION

According to the present invention to provide a wireless communication system, weak radio wave communication device, mobile terminal device, base station device, and programs of the devices for reliably achieving communication with weak radio wave communication devices such as wireless tags that emit merely weak radio waves without being interrupted by strong radio waves of base station devices and mobile terminals in a wireless LAN environment.

Mobile Terminal Device Program of First Invention

The present invention provides a wireless communication program executed by a computer of a mobile terminal device.

The wireless communication program of the present invention is characterized by causing a computer of a mobile terminal device communicatable by a frequency band of a wireless network with one or a plurality of weak radio wave communication device such as a wireless tag which is disposed in a predetermined area in a dispersed manner and transmits/receives information by wireless communication of weak transmission power which is smaller than the transmission power of the mobile terminal device to function as a transmission clear message transmitting unit which sets and transmits a predetermined receiving address, which is not used by a communication device in the predetermined area, as a receiving address of a special transmission clear message, which is a message that stops transmission of other communication device other than the receiving address, upon communication with the weak radio wave communication device, and a receiving unit which receives information, which is transmitted after transmission from the transmission clear message transmitting unit, as information from the weak radio wave communication device.

Herein, the predetermined receiving address, which is not used by the communication device in the predetermined area, comprises a particular MAC address which is determined in advance, a MAC address of an already discarded communication device, an unused MAC address which is newly reserved, or a MAC address of a communication device which does not exist in the utilized environment.

The transmission clear message transmitting unit of the mobile terminal device transmits a special clear to send frame (CTS message) including a predetermined receiving MAC address, which is not used by the communication device in the predetermined area, and transmission planned time when communicating with the weak radio wave communication device, and the message responding unit of the weak radio wave communication device transmits predetermined information, which is determined in advance, when receiving the special clear to send frame.

System of First Invention

The present invention provides a wireless communication system. In the present invention, the wireless communication system has a mobile terminal device, which is communicatable in a frequency band of a wireless network and transmits/receives information by wireless communication, and one or a plurality of weak radio wave communication device, which is disposed in a predetermined area in a dispersed manner and transmits/receives information by wireless communication of weak transmission power smaller than the transmission power of the mobile terminal device; wherein, in the mobile terminal device, a transmission clear message transmitting unit which sets and transmits a predetermined receiving address, which is not used by a communication device in the predetermined area, as a receiving address of a special transmission clear message, which is a message that stops transmission of other communication device other than the receiving address, upon communication with the weak radio wave communication device is provided, and, in the weak radio wave communication device, a message responding unit which transmits predetermined information, which is determined in advance, to the mobile terminal device when the special transmission clear message to the predetermined receiving address, which is not used by the communication device in the predetermined area, is received is provided.

Herein, the predetermined area is a wireless local area network environment in which the base station device is installed as an access point;

each of the mobile terminal device and the weak power communication device has a circuit function communicatable in the wireless local area network; and the predetermined receiving address, which is not used by the communication device in the predetermined area, is a particular MAC address which is determined in advance, a MAC address of an already discarded communication device, an unused MAC address which is newly reserved, or a MAC address of a device which is not used by the communication device in the predetermined area.

The transmission clear message transmitting unit of the mobile terminal device transmits a clear to send frame including a predetermined receiving MAC address, which is not used by the communication device in the predetermined area, and transmission planned time when communicating with the weak radio wave communication device; and the message responding unit of the weak radio wave communication device transmits predetermined information, which is determined in advance, when receiving the special clear to send frame.

Weak Radio Wave Communication Device of First Invention

The present invention provides a weak radio wave communication device.

The weak radio wave communication device, which is disposed in a dispersed manner in a utilization environment of a wireless network, in which a mobile terminal device which transmits/receives information by wireless communication is present, and transmits/receives information by wireless communication of weak transmission power smaller than the transmission power of a base station device and the mobile terminal device has a message responding unit which transmits predetermined information, which is determined in advance, when receiving a special transmission clear message including a receiving address, which cannot exist in the utilization environment, from the mobile terminal device.

Mobile Terminal Device of First Invention

The present invention provides a mobile terminal device. In the present invention, the mobile terminal device which is a device which transmits/receives information by wireless communication while moving in a utilization environment of a wireless network in which a base station, which transmits/receives information by wireless communication, and a weak radio wave communication device, which transmits/receives information by wireless communication of weak transmission power smaller than the transmission power of the base station device are present has a transmission clear message transmitting unit which transmits a special transmission clear message including a receiving address, which cannot exist in the utilization environment, and transmission planned time upon acquisition of information from the weak radio wave communication device.

Base Station Device Program of Second Invention

The present invention provides a base station device program. In the present invention, the wireless communication program causes a computer of a base station device which relays wireless communication to a wired network system to function as a transmission clear message transmitting unit which transmits a special transmission clear message including a receiving address, which cannot exist in a utilization environment, and transmission planned time when receiving the special communication requesting message from a weak radio wave communication device and a transmission operation prohibiting unit which prohibits transmission operation for the transmission planned time in the message when receiving the special transmission clear message.

System of Second Invention

The present invention provides a wireless communication system. In the present invention, the wireless communication system has a base station device and a mobile terminal device which transmit/receive information by wireless communication and a weak radio wave communication device which is disposed in a utilization environment in a dispersed manner and transmits/receives information by wireless communication of weak transmission power smaller than the transmission power of the base station device and the mobile terminal device; wherein the weak radio wave communication device has a communicatable device administration unit which registers and administers the communicatable base station device in advance or performs administration by confirming and registering the communicatable base station device periodically and a transmission requesting message transmitting unit which transmits a special transmission requesting message including a receiving address, which cannot exist in the utilization environment, and then transmits predetermined information to the mobile terminal device when approach of the mobile terminal device is detected; and the base station device has a transmission clear message transmitting unit which transmits a special transmission clear message including the receiving address, which cannot exist in the utilization environment, and transmission planned time when receiving the special communication requesting message from the weak radio wave communication device and a transmission operation prohibiting unit which prohibits transmission operation for the transmission planned time in the message when receiving the special transmission clear message.

Weak Radio Wave Communication Device of Second Invention

The present invention provides a weak radio wave communication device such as a wireless tag.

The weak radio wave communication device which is a device which is disposed in a dispersed manner in a utilization environment of a wireless network, in which a base station device which transmits/receives information by wireless communication and a mobile terminal device which transmits/receives information by wireless communication are present, and transmits/receives information by wireless communication of weak transmission power smaller than the transmission power of the base station device and the mobile terminal device has a communicatable device administration unit which registers and administers the communicatable base station device in advance or performs administration by confirming and registering the communicatable base station device periodically and a transmission requesting message transmitting unit which transmits a special transmission requesting message including a transmission node address, which cannot exist in the utilization environment, to the communicatable base station device when approach of the mobile terminal device is detected, causes the base station device to transmit a special transmission clear message including a receiving address, which cannot exist in the utilization environment, and transmission planned time, and then transmits information, which is determined in advance, to the mobile terminal device.

Base Station Device of Second Invention

The present invention provides a base station device. In the present invention, the base station device which is a device which is fixedly disposed in a utilization environment of a wireless network, in which a mobile terminal device which transmits/receives information by wireless communication and a weak radio wave communication device which transmits/receives information by wireless communication of weak transmission power smaller than the transmission power of the mobile terminal device are present, and transmits/receives information by wireless communication has a transmission clear message transmitting unit which transmits a special transmission clear message including a receiving address, which cannot exist in the utilization environment, and transmission planned time to other base station device when receiving a communication requesting message including a transmission node address, which cannot exist in the utilization environment, from the weak radio wave communication device and a transmission operation prohibiting unit which prohibits transmission operation for the transmission planned time in the message when receiving the special transmission clear message.

System of Third Invention

The present invention provides a wireless communication system. In the present invention, the wireless communication system has a base station device which is fixedly installed in a utilization environment of a wireless network and transmits/receives information by wireless communication;

a mobile terminal device which moves in the utilization environment and transmits/receives information by wireless communication; and a weak radio wave communication device which is disposed in a dispersed manner in the utilization environment and transmits/receives information by wireless communication of weak transmission power smaller than the transmission power of the base station device and the mobile terminal device; wherein, in the weak radio wave communication device, a message transmitting unit which increases the transmission power so as to transmit a special transmission clear message including a receiving address, which cannot exist in the utilization environment, and transmission planned time and then transmits information, which is determined in advance, to the mobile terminal device is provided; and, in the base station device, a transmission operation prohibiting unit which prohibits transmission operation for the transmission planned time in the message when receiving the transmission clear message is provided.

Weak Radio Wave Communication Device of Third Invention

The present invention provides a weak radio wave communication device such as a wireless tag. In the present invention, the weak radio wave communication device which is a device which is disposed in a dispersed manner in a utilization environment of a wireless network, in which a base station device which transmits/receives information by wireless communication and a mobile terminal device which transmits/receives information by wireless communication are present, and transmits/receives information by wireless communication of weak transmission power smaller than the transmission power of the base station device and the mobile terminal device has a message transmitting unit which increases the transmission power when approach of the mobile terminal device is detected, transmits a special transmission clear message including a receiving address, which cannot exist in the utilization environment, and transmission planned time and transmits information which is determined in advance, to the mobile terminal device while prohibiting transmission operation of the base station device for the transmission planned time in the message.

In the present invention, even in a utilization environment in which a weak radio wave from a weak radio wave communication device is cancelled by a strong radio wave from a base station device serving as an access point of a wireless LAN or a mobile terminal device, the transmission operation from the device that emits strong radio waves is temporarily prohibited in order to enable reception of the weak radio wave; therefore, communication by the weak radio wave can be reliably performed. Specifically, the transmission operation of the base station device is temporarily prohibited by utilizing a clear to send (Clear To Send) frame, in other words, a CTS frame known as a control frame of a wireless LAN standard of IEEE 802.11. In other words, a special CTS frame, in which a MAC address not existing in the utilization environment is set as a receiving address set in the CTS frame, is generated and transmitted, the transmission operation is prohibited for the communication planned time in the frame when this special CTS frame is received by a base station, and, during that period, communication by the weak radio wave of the weak radio wave communication device is reliably performed without being interrupted by the strong radio wave from the access point or the mobile terminal. The transmission of the special CTS frame of the MAC address not existing in the utilization environment is either performed from the mobile terminal which emits a strong electrical field (first invention), performed from the base station device based on a request of the wireless tag (second invention), or performed by temporarily increasing the transmission power in the weak radio wave communication device (third invention); and, in either case, information of the weak radio wave of the weak radio wave communication device can be reliably received and utilized by keeping the other mobile terminal devices and base station devices, which are present in the utilization environment, still. The above and other objects, features, and advantages of the present invention will become more apparent from the following detailed description with reference to the drawings.

BRIEF DESCRIPTION OF THE DRAWINGS

FIGS. 5A and 5B are time charts showing basic data transmission of a wireless LAN;

FIGS. 7A to 7D are time charts showing data transmission in a MAC layer according to the first embodiment;

FIGS. 17A to 17D are time charts showing data transmission in a MAC layer according to the second embodiment;

FIGS. 18A and 18B are explanatory diagrams of a special RTS frame and an approach detection RTS frame used in the second embodiment;

FIG. 19 is a time chart showing a data transmission process of the second embodiment;

DETAILED DESCRIPTION OF THE PREFERRED EMBODIMENTS

Figure 1:
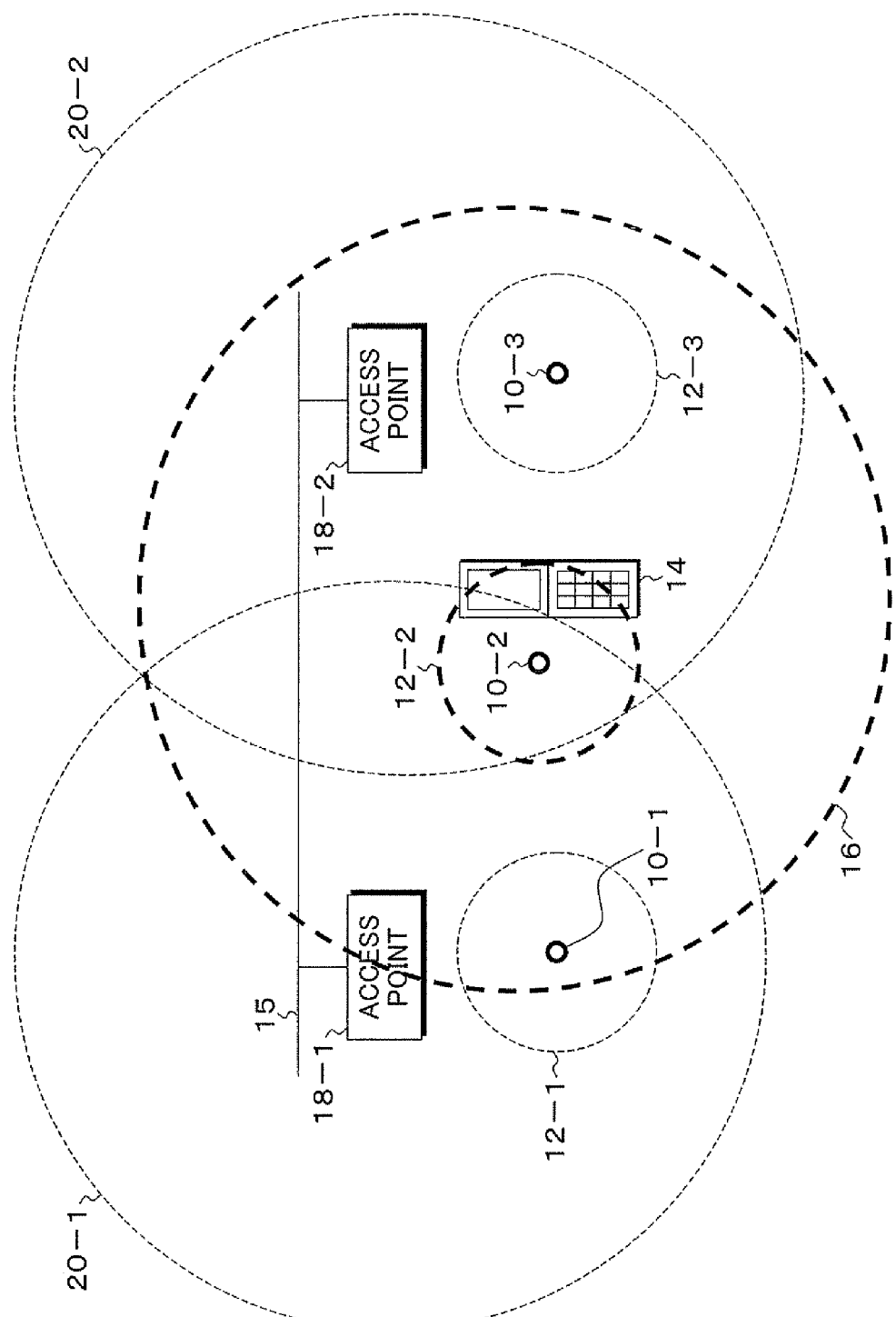
FIG. 1 is an explanatory diagram of a system configuration showing a first embodiment of the present invention.

FIG. 1 is an explanatory diagram of a system configuration showing a first embodiment of a wireless LAN system according to a first invention of the present application. In FIG. 1, the system environment of the present embodiment is for a wireless LAN environment. An environment according to technology standardization of IEEE 802.11 can be utilized as such a wireless LAN environment. In the present embodiment, explanations will be given by using IEEE 802.11g as an example. As a wireless LAN environment such as that described above, in FIG. 1, access points 18-1 to 18-2 which function as base station devices are installed, and they have communicatable areas 20-1 and 20-2, respectively. In the communicatable areas 20-1 and 20-2 of the access points 18-1 and 18-2, wireless tags 10-1, 10-2, and 10-3 which function as weak radio wave communication devices are present. The wireless tags 10-1 to 10-3 communicate information by wireless communication of weak transmission power that is smaller than the transmission power of the access points 18-1 and 18-2. Also in each of the wireless tags 10-1 to 10-3, a communication module according to IEEE 802.11g is mounted as well as the access points 18-1 to 18-2. Since the transmission power of the wireless tags 10-1 to 10-3 is small, they have communicatable areas 12-1, 12-2, and 12-3, respectively; and each of the communicatable areas 12-1 to 12-3 has, for example, a radius of about 1 meter to about several tens of centimeters or less. As a specific installation example of the wireless tags 10-1 to 10-3, for example, they are installed on commercial product shelves in a store in which a wireless LAN environment installing the access points 18-1 and 18-2 is build, commercial product information or the like is stored in the wireless tags 10-1 to 10-3, and purchasers read the wireless tag stored information so as to utilize them. They can be also utilized by installing the wireless tags 10-1 to 10-3 on the floors, walls, or the like of a facility, storing positional information therein, and reading the tag information when approaching to the wireless tags so as to recognize the current position. The information stored in the wireless tags 10-1 to 10-3 is read by a mobile terminal 14 which functions as a mobile terminal device that a user who utilizes the wireless LAN environment has. The mobile terminal 14 is, for example, a portable phone, and the mobile terminal 14 can perform data transmission by using roaming while sequentially moving in the communicatable areas 20-1 and 20-2 of the access points 18-1 and 18-2. The mobile terminal 14 has a communicatable area 16, for example, having a size that it can always communicate with a particular access point. In a first embodiment of the present invention, when a user carrying the mobile terminal 14 approaches, for example, the wireless tag 10-2 and an operation necessary for reading the information of the wireless tag 10-2 is performed, a special transmission clear message including a non-existing MAC address, which is a receive address that cannot exist in the wireless LAN environment, and transmission planned time, specifically, a CTS frame (Clear to Send frame) including a non-existing MAC address as a frame destination address. When the access points 18-1 and 18-2 receive the special CTS frame from the mobile terminal 14, they prohibit transmission during the transmission planned time period in a frame. During that period, without being disturbed by the strong radio waves from the access points 18-1 and 18-2, the mobile terminal 14 can reliably receive a data frame by a weak radio wave from the wireless tag 10-2. Note that the wireless tags 10-1 to 10-3 will be simply described as wireless tags 10 in the below description in the case in which there is no need to distinguish them from each other. This point is also same for the access points 18-1 and 18-2.

Figure 2:
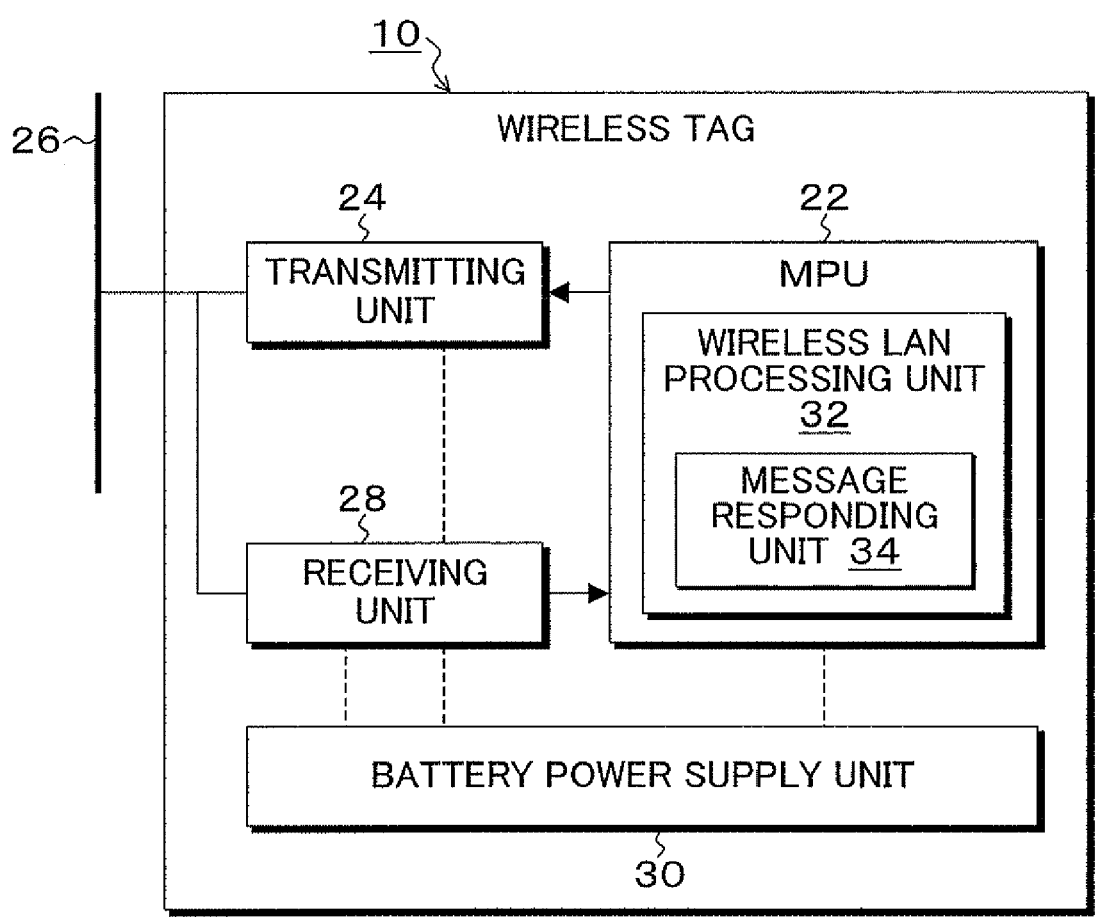
FIG. 2 is a block diagram showing a functional configuration of a wireless tag in the first embodiment.

FIG. 2 is a block diagram showing a functional configuration of the wireless tag 10 in the first embodiment. In FIG. 2, the wireless tag 10 is composed of an MPU 22, a transmitting unit 24, an antenna 26, a receiving unit 28, and a battery power supply unit 30. The wireless communication method used by the transmitting unit 24 and the receiving unit 28 is, for example, spread spectrum communication. In the MPU 22, a processing function according to IEEE 802.11g is provided as a wireless LAN processing unit 32, and a message responding unit 34 which is a function unique to the present embodiment is provided therein. When the message responding unit 34 receives the special CTS frame, which has the non-existing MAC address that cannot exist in the wireless LAN environment, from the mobile terminal 14 shown in FIG. 1, the unit generates a data frame, in which the information that is stored in an unshown memory of the MPU 22 in advance is set, and transmits and outputs that from the transmitting unit 24 and the antenna 26. Herein, for example, the following can be utilized as the MAC address herein which cannot exist in the wireless LAN environment used in the present embodiment.
(1) A particular MAC address that is determined in advance
(2) A MAC address of an already discarded communication device
(3) An unused MAC address that is newly reserved
(4) A MAC address of a communication device that does not present in the wireless LAN environment Note that, the non-existing MAC address of the present embodiment is not limited to the MAC address that does not exist in the wireless LAN environment, and an address of a wireless tag that is present therein can be also utilized if agreement is made in advance for the address. In other words, the address that can be used as the non-existing MAC address of the present embodiment may be an arbitrary address as long as there is agreement between the wireless tags and the device that transmits the special CTS frame and the address is other than the address of a wireless communication device which is present therein but does not participate in the agreement.

Figure 3:
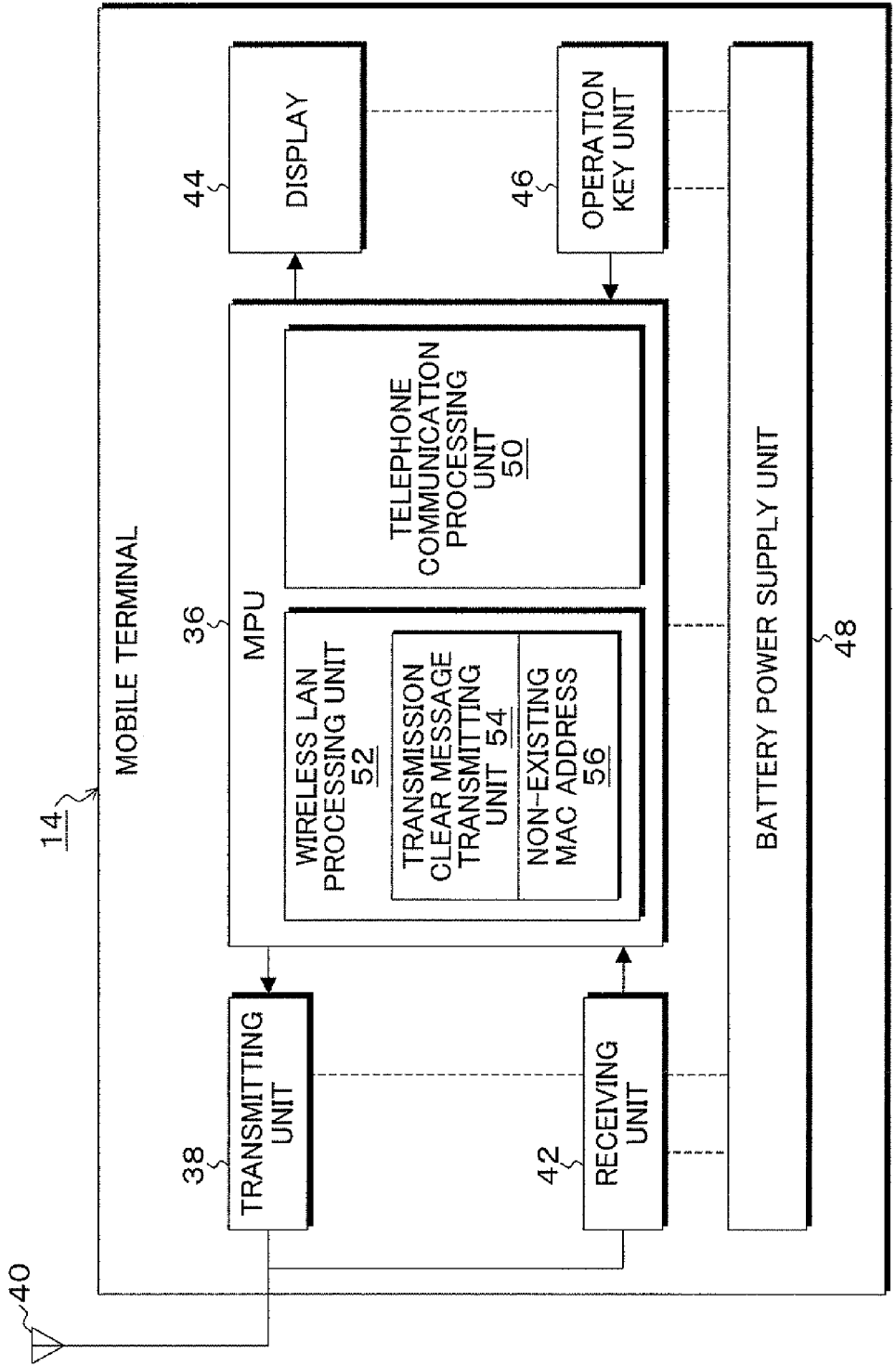
FIG. 3 is A block diagram showing a functional configuration of a mobile terminal in the first embodiment.

FIG. 3 is a block diagram showing a functional configuration of the mobile terminal 14 in the first embodiment of FIG. 1. The mobile terminal 14 is, for example, a portable phone and is composed of an MPU 36, a transmitting unit 38, an antenna 40, a receiving unit 42, a display 44, an operation key unit 46, and a battery power supply unit 48. In the MPU 36, a telephone call processing unit 50 and a wireless LAN processing unit 52 are provided. In the wireless LAN processing unit 52, in addition to a processing function according to IEEE 802.11g, a transmission clear message transmitting unit 54 which is a function unique to the present embodiment is provided, and, furthermore, a non-existing MAC address 56 is set. When the transmission clear message transmitting unit 54 is to acquire information from the wireless tag 10 shown in FIG. 2, the unit transmits a special CTS frame which functions as a special transmission clear message including the non-existing MAC address 56, which cannot exist in the wireless environment, and predetermined transmission planned time.

Figure 4:
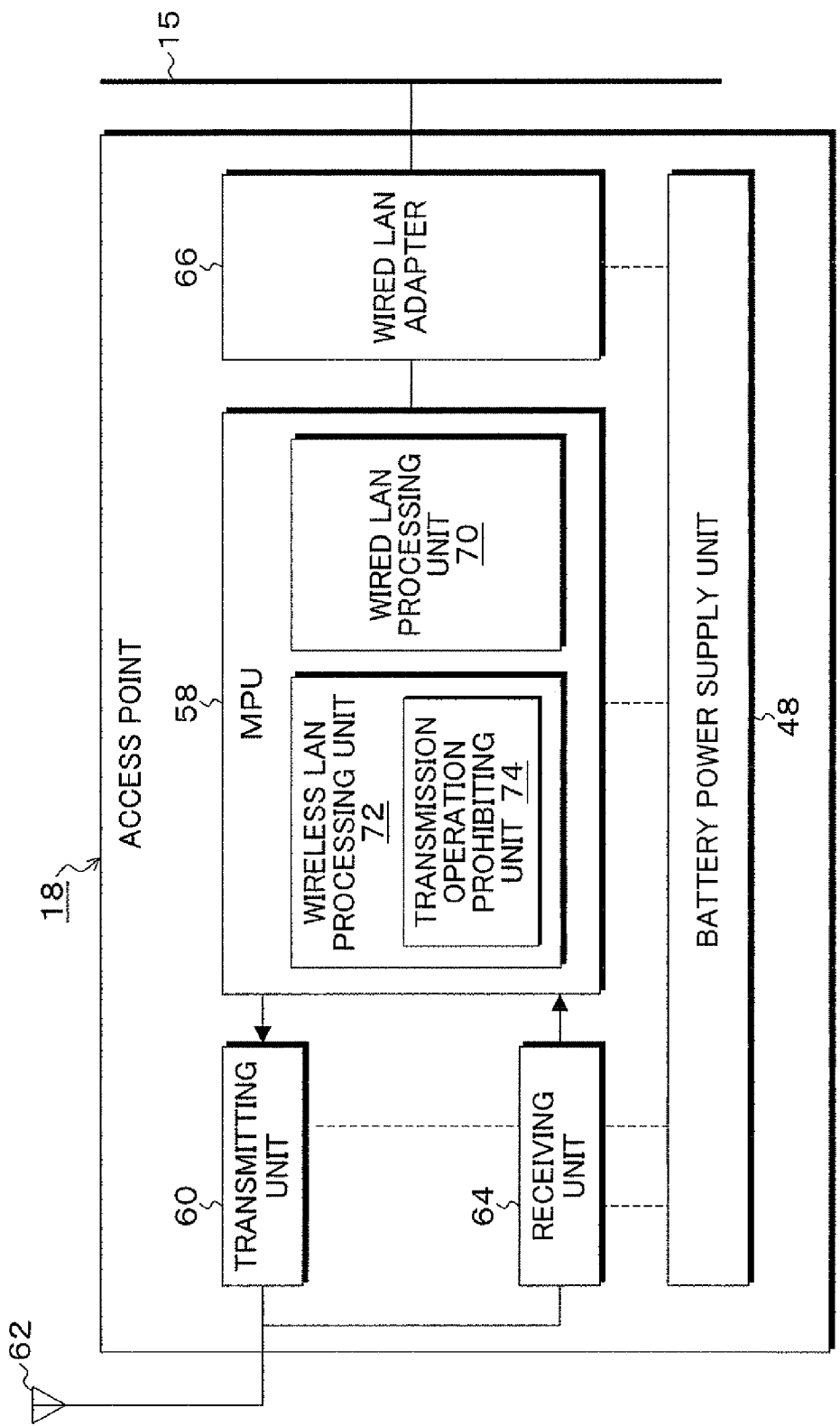
FIG. 4 is a block diagram showing a functional configuration of an access point in the first embodiment.

FIG. 4 is a block diagram showing a functional configuration of the access point 18 in the first embodiment. In FIG. 4, the access point 18 is composed of an MPU 58, a transmitting unit 60, an antenna 62, a receiving unit 64, a wired LAN adapter 66, and a battery power supply unit 68. In the MPU 58, a wired LAN processing unit 70 and a wireless LAN processing unit 72 are provided. The wired LAN adapter 66 is connected to an external wired LAN 15. In the wireless LAN processing unit 72, a transmission operation prohibiting unit 74 is provided. When the transmission operation prohibiting unit 74 receives the special transmission clear message, that is, the special CTS frame including the non-existing MAC address that cannot exist in the wireless LAN environment and transmission planned time from the mobile terminal 14 of FIG. 3, the unit prohibits transmission operations during the transmission planned time in the frame. Herein, the wireless LAN processing unit 72 of the access point 18 according to IEEE 802.11g generates an administration list of communicatable devices through association with the terminals present in the communicatable area of the point, references the administration list when a frame is received, and executes communication processing in the corresponding case. However, when the access point 18-2 of FIG. 1 is taken as an example, association per se is not established for the wireless tags 10-2 and 10-3 present in the communicatable area 20-2 thereof since the communicatable areas 12-2 and 12-3 of the wireless tags 10-2 and 10-3 are too small, the wireless tags 10-2 and 10-3 are not registered in the administration list of the access pointer 18-2; and the wireless tags 10-2 and 10-3 are not present in the wireless LAN environment. The non-existing MAC address of the special CTS frame transmitted from the mobile terminal 14 is set as a frame destination address in the frame; however, also this frame destination address is not present in the administration list of the access point 18-2, and the access point 18-2 ignores the special CTS frame without any arrangement. However, in the present embodiment, the transmission operation prohibiting unit 74 is provided in the access point 18 as shown in FIG. 4; as a result, the special CTS frame having the non-existing MAC address can be recognized, and the transmission operation of the point per se can be prohibited as well as the case of the CTS frame from a terminal that is registered in the administration list.

FIGS. 5A and 5B are time charts showing basic data transmission of the wireless LAN shown in FIG. 1. FIG. 5A is a transmitting terminal, and FIG. 5B is a receiving terminal, wherein the transmitting terminal is, for example, the mobile terminal 14, and the receiving terminal is the access point 18-2. As a matter of course, inversely, the transmitting terminal may be the access point 18-2 and the receiving terminal may be the mobile terminal 14. FIGS. 5A and 5B show a transmission process that realizes virtual carrier sense for avoiding "hiding problem" wherein collision in the case in which two terminals from which radio waves cannot directly reach the access points serving as base station devices are present is avoided. The mechanism of virtual carrier sense is an idea of a kind of reservation in which a value called NAV (Network Allocation Vector) representing a transmission prohibited period is set so as to indicate that it is in use during the period of NAV. The value of NAV determining this transmission prohibited period is used when two frames, a RTS (Request To Send) frame and a CTS (Clear to Send) frame, are to be exchanged between transmitting/receiving sides.

Figure 6A:
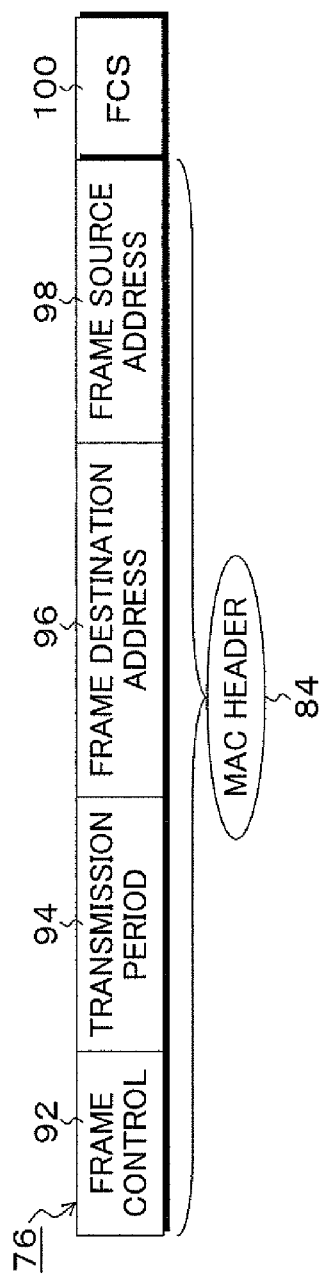
FIGS. 6A to 6C are Explanatory diagrams of control frames of the wireless LAN.
Figure 6B:
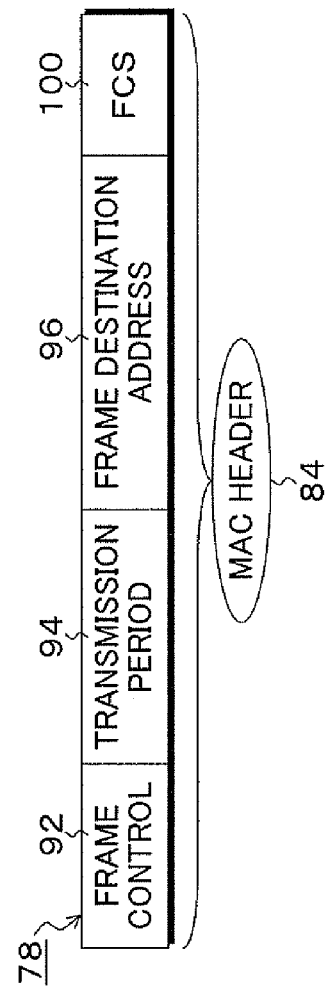
Figure 6C:
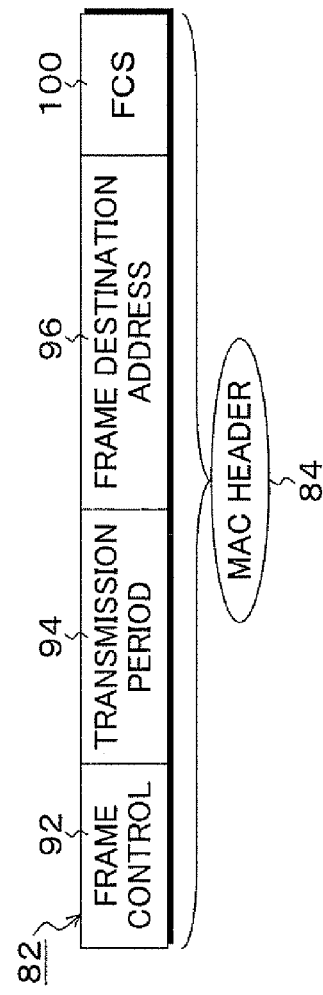

FIGS. 6A to 6C show an RTS frame 76, a CTS frame 78, and an ACK frame 82 used in the wireless LAN. The RTS frame 76 of FIG. 6A is composed of frame control 92, a transmission period (transmission planned time) 94, a frame destination address 96, a frame source address 98, and FCS 100. In the transmission period 94 in this frame, the value of NAV determining a transmission prohibited period is set in the case of the RTS frame 76. The frame destination address 96 is the address of a terminal or a base station which receives the frame per se in wireless LAN communication, and it is different from a target address DA (Destination Address) which is a terminal address that finally receives the frame. Similarly, the frame source address 98 is the address of a terminal or a base station of a transmission source which transmits the frame in the wireless LAN communication, and it is different from a source address SA (Source Address) which originally generates and transmits the frame. FCS 100 is a CRC (cyclic redundancy code) of 32 bits utilized for detecting errors in the entire frame.

FIG. 6B shows the CTS frame 78, which is composed of frame control 92, a transmission period 94, a frame destination address 97, and FCS 100. Furthermore, FIG. 6C shows the ACK frame, which is composed of frame control 92, a transmission period 94, a frame destination address 96, and FCS 100. Normally, in wireless LAN communication, there are three types of MAC frames, such as a data frame, a control frame, and an administration frame, and the format thereof is composed of a MAC header, a frame main body, and FCS. Among these, each of the control frames such as the RTS frame 76, the CTS frame 78, and the ACK frame 82 shown in FIGS. 6A to 6C is composed of the MAC header 84 and the FCS 100 without the frame main body (payload). Referring again to FIGS. 5A and 5B, the basic data transmission of the wireless LAN which realizes the mechanism of virtual carrier sense will be described. When a transmission request of data is generated at time t1, the transmitting terminal side of FIG. 5A transmits the RTS frame 76 after reaching DIFS time since it is the first data transmission timing. The DIFS time is waiting time for starting data transmission, and carrier sense is performed at this timing. If there is no carrier from other terminals, the RTS frame is transmitted when a randomly set value of a backoff is counted down to zero. Note that the DIFS is a DCF interface frame, and DCF exhibits the function of distributed coordination function (Distributed Coordination Function) which starts transmission after the backoff is set according to the carrier sense. When the transmitting terminal transmits the RTS frame, the receiving terminal receives that and transmits the CTS frame 78 in SIFS (smallest inter-frame space) determining a minimum frame interval. After the transmitting terminal receives the CTS frame 78, SIFS time is waited for, and a data frame 80 is received. When the receiving terminal receives the data frame 80, the terminal waits for SIFS time and transmits the ACK frame 82. In the RTS frame 76 and the CTS frame 78, in the fields of the transmission periods 94 of FIGS. 6A and B, the values of NAV that determine the transmission prohibited periods in other terminals are set. Therefore, the other terminal which has received the RTS frame 76 or the CTS frame 78 recognizes that it is in use by another user during the period determined by the value of NAV in the frame, considers that a busy state continues as physical carrier sense, and prohibits data transmission during that period. The time from the time t1 from time t3 during which the series of transmission of the control frame and the data frame is performed is 1-packet transmission time T1. Transmission prohibited time T2 described in the frame of the RTS frame 76 is T2=SIFS+CTS frame+SIFS+data frame+SIFS+ACK frame. Furthermore, Transmission prohibited time T3 according to the NAV value described in the frame of the CTS frame 76 is T3=SIFS+data frame+SIFS+ACK frame.

FIGS. 7A to 7D are time charts showing data transmission according to the first embodiment of the present invention utilizing the control frames according to the data transmission of the wireless LAN shown in FIGS. 5A, 5B, 6A, 6B, and 6C. FIG. 7A shows the mobile terminal 14, FIG. 7B shows the wireless tag 10, and FIGS. 7C and 7D show the access points 18-1 and 18-2. When the mobile terminal 14 of FIG. 7A reads the data of the wireless tag 10 at a base station, the terminal transmits a special CTS frame 78-1 when data read of the wireless tag is requested by a predetermined key operation or the like of the wireless terminal.

Figure 8A:
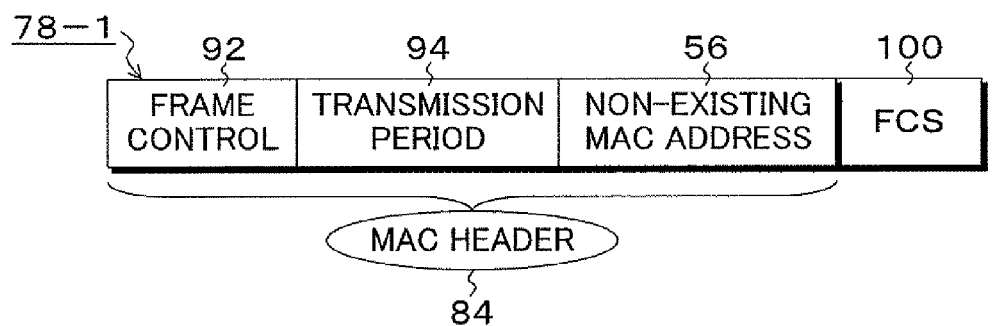
FIGS. 8A and 8B are explanatory diagrams of special control frames used in the first embodiment.
Figure 8B:
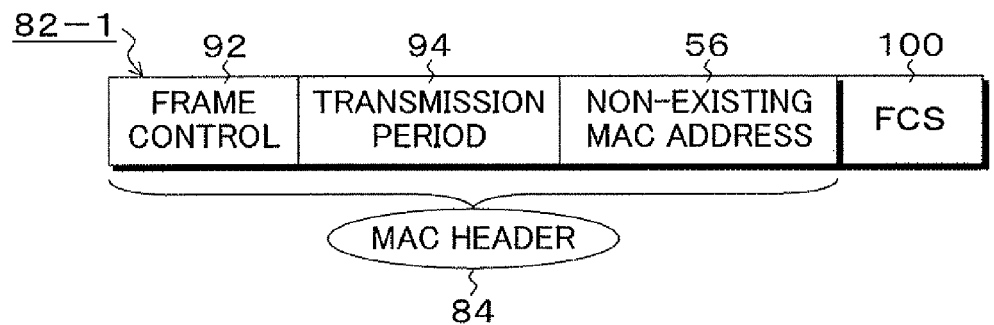

FIG. 8A is an explanatory diagram of the special CTS frame 78-1 used in the first embodiment. In the special CTS frame 78-1, a MAC header 84 is constituted by setting frame control 92, a transmission period 94, and, subsequently in the field of a next frame destination address, a non-existing MAC address 56, which is an address that cannot exist in the wireless LAN environment; and FCS 100 is provided at the end. Referring again to FIGS. 7A to 7D, the special CTS frame 78-1 transmitted from the mobile terminal 14 of FIG. 7A is received by the wireless tag 10, and the access points 18-1 and 18-2. The access points 18-1 and 18-2 which have received the special CTS frame 78-1 acquire the non-existing MAC address 56 shown in FIG. 8A as frame destination addresses in the received frame and based on that, execute transmission operation prohibition 90-1 and 90-2 from the frame end of the CTS frame 78 shown in FIGS. 5A and 5B until transmission prohibited time T3 that is until reception of the ACK frame 82 is finished based on the NAV value set in the transmission period 94 in the frame. Therefore, after the special CTS frame 78-1 is transmitted, radio-wave transmission from the access points 18-1 and 18-2 is not performed, and the wireless tag 10 reads the information, which is stored in advance, corresponding to reception of the special CTS frame 78-1 and transmits the data frame 80 to the mobile terminal 14, thereby reliably transmitting the data frame 80 to the mobile terminal 14 even if the radio wave of the wireless tag 10 is weak without being interrupted by the radio waves from the access points 18-1 and 18-2. When the mobile terminal 14 normally receives the data frame 80, specifically, when there is no error detection by the FCS 100 at the end of FIG. 8A and it is normal, the terminal transmits a special ACK frame 82-1. In this special ACK frame 82-1 is, as shown in FIG. 8B, a MAC header 84 is composed of frame control 92, a transmission period 94, and a non-existing MAC address 56 serving as a frame destination address, and FCS 100 is provided at the end. Referring again to FIGS. 7A to 7D, when the wireless tag 10 receives the special ACK frame 82-1 from the mobile terminal 14, the tag recognizes the fact that the data frame 80 is normally received and terminates the process. Note that, when the special ACK frame 82-1 cannot be received even when certain time is elapsed after transmission of the data frame 80, retransmission of the data frame 80 is repeated by the number of times that is determined in advance until the special ACK frame 82-1 is received. In this case, also in the side of the access points 18-1 and 18-2, since the special ACK frame 82-1 is not received, reception of the special ACK frame 82-1 is waited for while extending the transmission operation prohibited time T3 according to the NAV value of the special CTS frame 78-1 so as to cancel the transmission operation prohibition 90-1 and 90-2.

Figure 9:
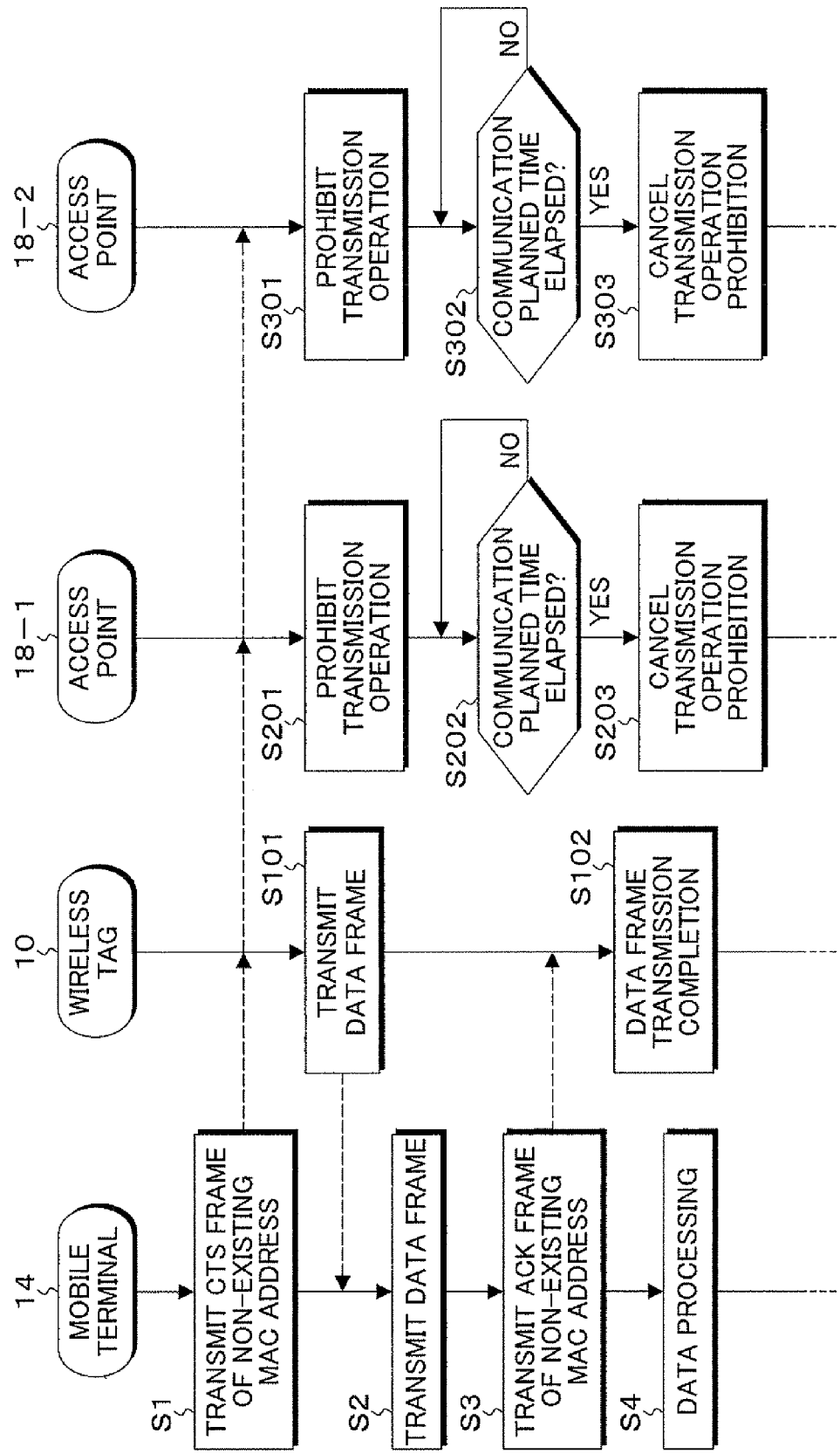
FIGS. 9A and 9B are time charts showing a data transmission process of the first embodiment.

FIGS. 9A and 9B are time charts showing a data transmission process of the first embodiment according to the present invention. When the mobile terminal 14 performs data read prohibition operation or the like in the vicinity of the wireless tag 10, the terminal transmits the special CTS frame of a non-existing MAC address in step S1. This special CTS frame is received by the wireless tag 10 and the access points 18-1 and 18-2 that present in the communicatable area of the mobile terminal 14. The access points 18-1 and 18-2, which have received the special CTS frame, prohibit transmission operations in steps S201 and S301 and wait for elapse of the communication planned time (transmission prohibited time) T3 determined by the NAV value in the frame in steps S202 and S302. On the other hand, when the wireless tag 10 receives the special CTS frame from the mobile terminal 14, the tag transmits a data frame in step S101. Therefore, the mobile terminal 14 receives the data frame in step S2 and then transmits the special ACK frame of the non-existing MAC address in step S3; and, receiving this, the wireless tag 10 recognizes data frame transmission completion in step S102 and terminates the series of processes. In the mobile terminal 14, data processing of the data frame received from the wireless tag 10 is executed in step S4. For example if the wireless tag sends positional data thereto, the terminal processes the positional data and outputs and displays the positional information, which indicates that it is in the vicinity of the disposed position of the wireless tag 10, to and on the mobile terminal 14. In addition, if commercial product information or the like is received from the wireless tag 10, the received commercial product information is displayed. During these processes, in the access points 18-1 and 18-2, elapse of the communication planned time T3 is checked in steps S202 and S302, and transmission operation prohibition is cancelled in steps S203 and S303 when T3 time elapse is determined, thereby returning to normal processes.

Figure 10:
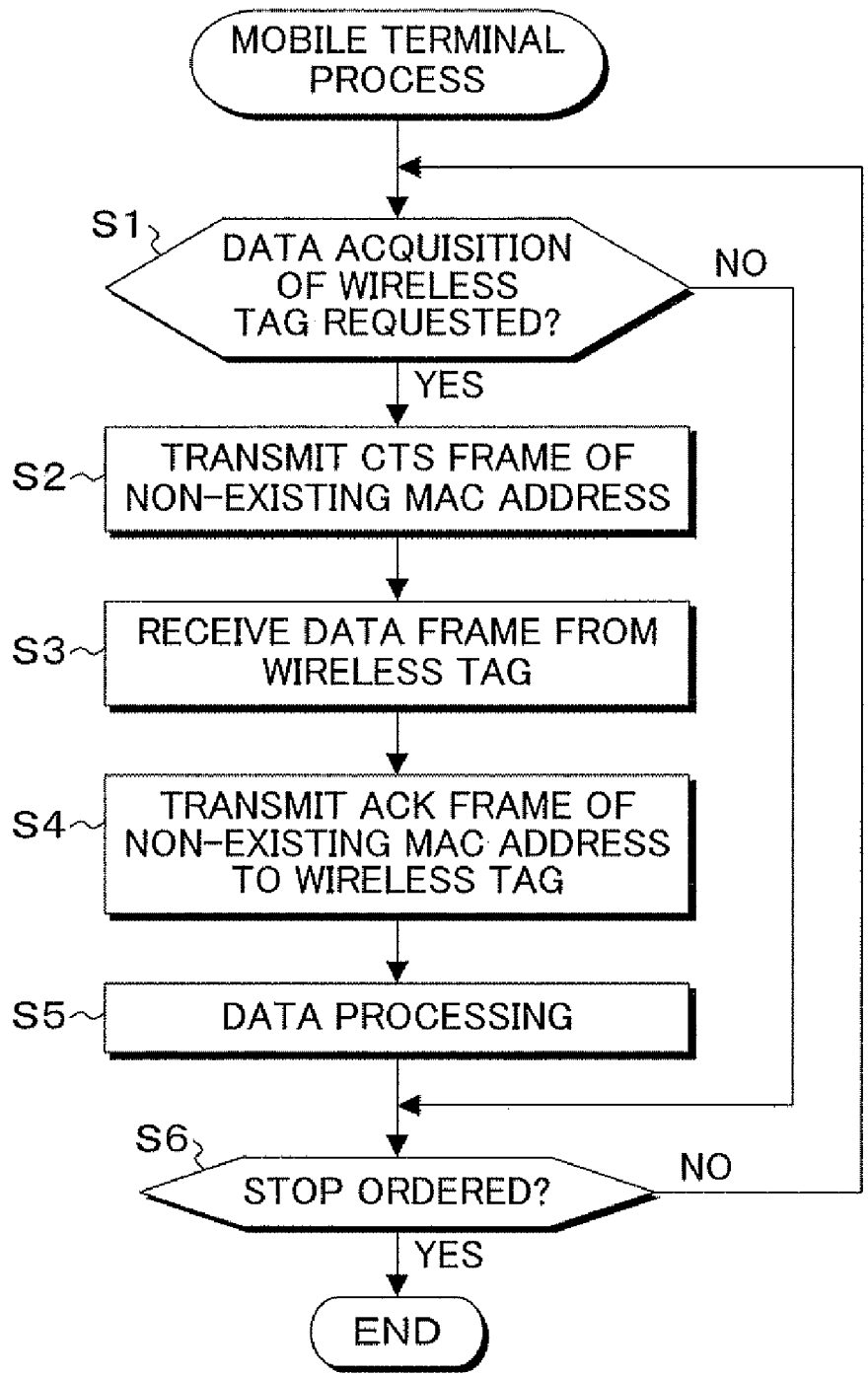
FIG. 10 is a flow chart of a mobile terminal process in the first embodiment.

FIG. 10 is a flow chart of the mobile terminal process in the first embodiment, and it will be described below with reference to FIG. 3. In FIG. 10, in the mobile terminal process, whether there is an acquisition request of the data of the wireless tag 10 made by, for example, operation of the operation key unit 46 is checked in step S1; and, when the data acquisition request is determined, the process proceeds to step S2, in which the transmission clear message transmitting unit 54 transmits the special CTS frame having the non-existing MAC address 56 and the NAV value determining transmission prohibited time. Subsequently, after the data frame is received from the wireless tag in step S3, the ACK frame of the non-existing MAC address is transmitted for the wireless tag to terminate the process in step S4, and data processing of the data obtained by the received data frame is performed in step S5. Such processes of steps S1 to S5 are repeated until there is a stop order in step S6.

Figure 11:
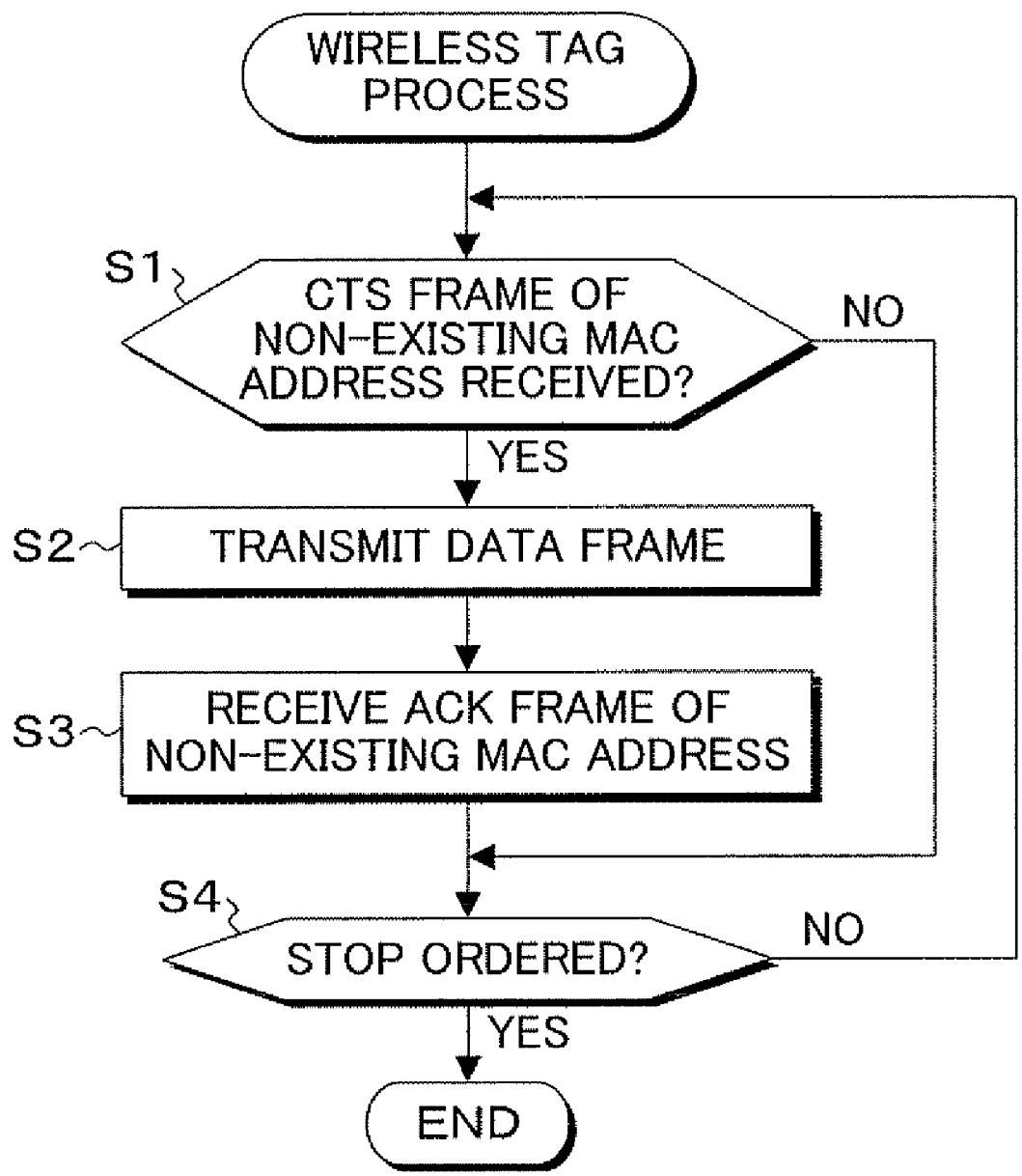
FIG. 11 is a flow chart of a wireless tag process in the first embodiment.

FIG. 11 is a flow chart of the wireless tag process in the first embodiment, and it will be described below with reference to FIG. 2. In the wireless tag process of FIG. 11, the message responding unit 34 checks whether the special CTS frame of the non-existing MAC address is received or not in step S1. When reception of the special CTS frame is determined, the process proceeds to step S2, in which the data frame including the frame main body (payload) in which read positional information, commercial product information, or the like stored in the memory in advance is set. Subsequently, in step S3, the special ACK frame of the non-existing MAC address is received from the mobile terminal, it is determined that the data frame is normally received, and the process is terminated. Such processes of steps S1 to S3 are repeated until there is a stop order in step S4. Note that, in the wireless tag process of FIG. 11, a minimum process for the case in which the special ACK frame of the non-existing MAC address is not received in step S3 is omitted.

Figure 12:
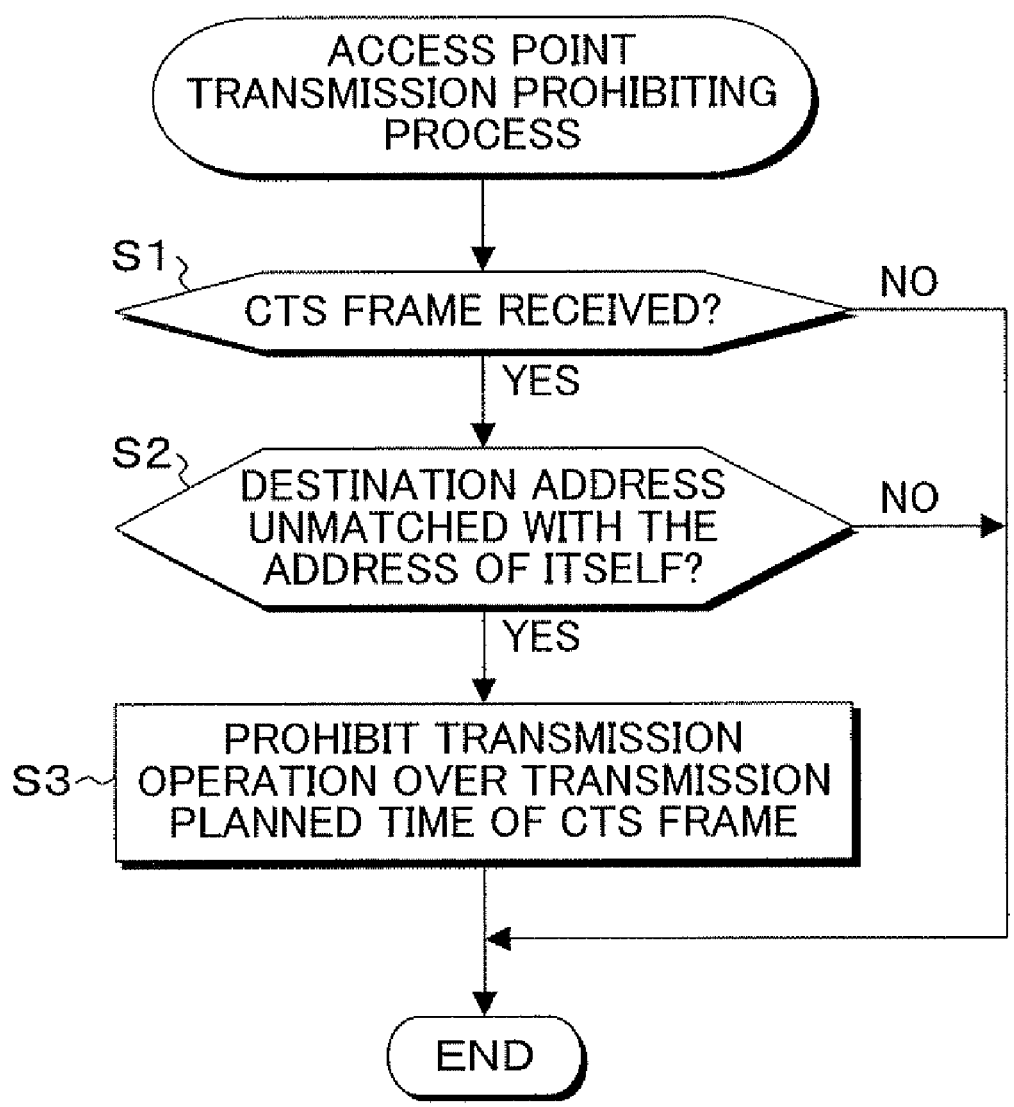
FIG. 12 is a flow chart of an access point transmission prohibiting process in the first embodiment.

FIG. 12 is a flow chart of the access point transmission prohibiting process in the first embodiment, and it will be described below with reference to FIG. 4. In FIG. 12, reception of the CTS frame from an arbitrary terminal is determined in step S1. This CTS frame includes both the normal CTS frame 78 shown in FIG. 6B and the special CTS frame 78-1 which is shown in FIGS. 8A and 8B and unique to the present embodiment. When reception of the CTS frame is determined in step S1, the process proceeds to step S2, in which it is checked whether the destination address is unmatched with the address of the access point per se. When they are unmatched, the process proceeds to step S3, in which transmission operation is prohibited for the transmission planned time of the CTS frame, in other words, for the transmission prohibited time determined by the NAV value in the frame. In this course, also when the frame destination address is the non-existing MAC address 56 according to the special CTS frame 78-1, transmission operation is similarly prohibited for the transmission planned time in the frame in step S3.

Figure 13:
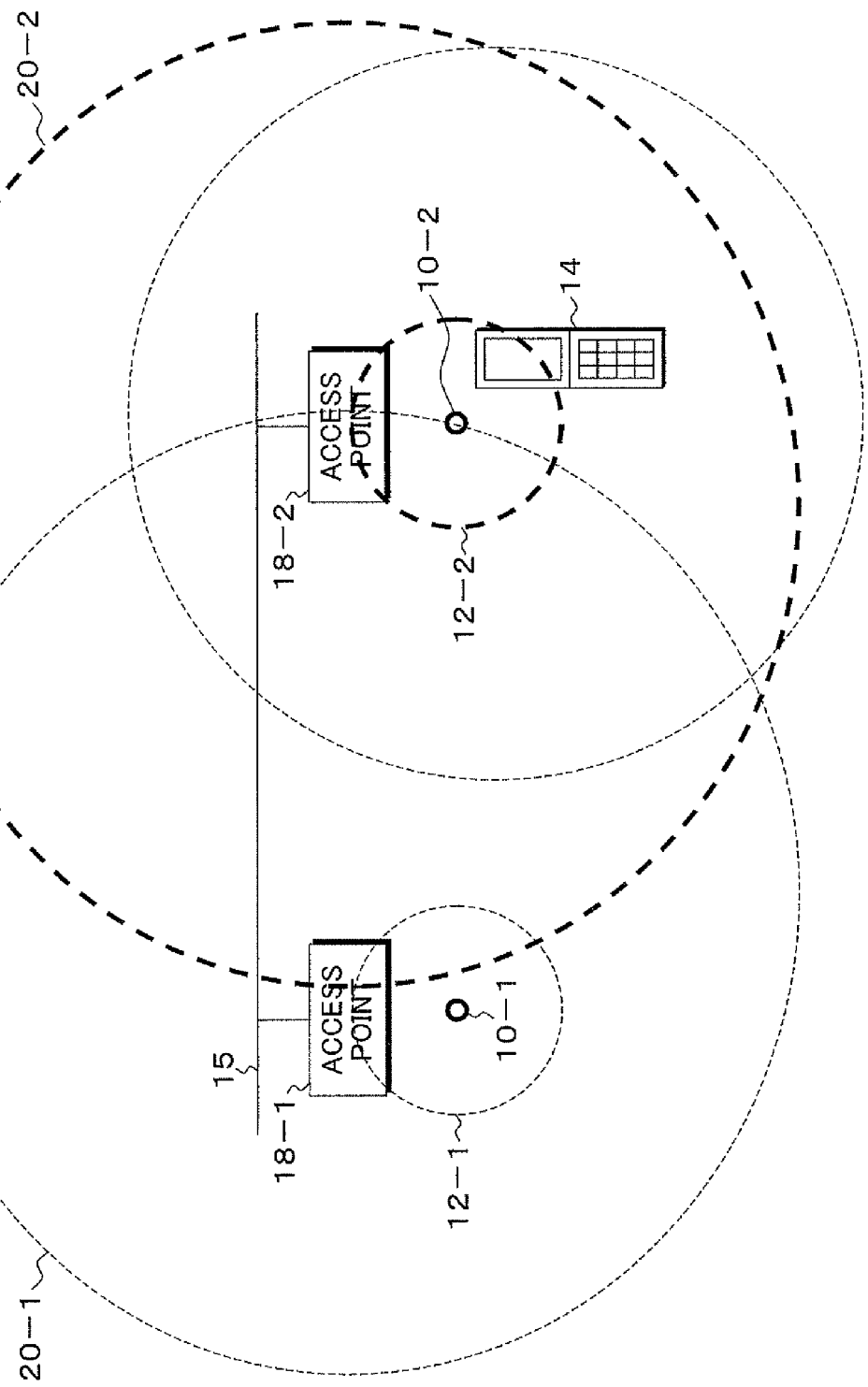
FIG. 13 is an explanatory diagram of a system configuration showing a second embodiment of the present invention.

FIG. 13 is an explanatory diagram of a system configuration showing a second embodiment corresponding to a wireless communication system according to a second invention of the present application. In FIG. 13, the second embodiment is for a wireless LAN environment comprising the communicatable areas 20-1 and 20-2 of the access points 18-1 and 18-2, which are connected by the wired LAN 15 and disposed as base station devices, as well as the first embodiment of FIG. 1, the wireless tags 10-1 and 10-2 are present in this wireless LAN environment, and the mobile terminal 14 is carried by a user. In the second embodiment, the access points 18-1 and 18-2 are present in the communicatable areas 12-1 and 12-2 formed by weak radio waves so that the wireless tags 10-1 and 10-2 can communicate with the access points 18-1 and 18-2. Therefore, the wireless tags 10-1 and 10-2 recognize and register the communicatable access points 18-1 and 18-2 by themselves in advance, respectively. In the second embodiment, for example as shown by the wireless tag 10-2, when the mobile terminal 14 approaches the communicatable area 12-2 thereof and a frame for approach detection is received along with an operation of the mobile terminal 14 for tag information acquisition, the wireless tag 10-2 transmits a special RTS frame, which is a transmission request message having a non-existing MAC address not existing in the wireless LAN environment, to the access point 18-2, which is registered as a communicatable counterpart. When the access point 18-2 receives the special RTS frame including the non-existing MAC address from the wireless tag 10-2, the point similarly transmits a special CTS frame including a non-existing MAC address, which cannot exist in the wireless LAN environment, and transmission planned time as a special transmission clear message. At the same time as the access point 18-2 transmits the special CTS frame, the access point prohibits transmission operation of the point per se for the transmission for the transmission planned time in the frame. Meanwhile, the other access point 18-1, which has received the special CTS frame transmitted from the access point 18-2, prohibits transmission operation for the transmission planned time of the received frame. In addition, in response to the reception of the special CTS frame from the access point 18-2, the wireless tag 10-2 reads the information stored in the tag per se and transmits a data frame, in which the information is set, to the mobile terminal 14. As described above, the second embodiment is characterized in that the wireless tag 10-2, which has received the data acquisition request from the mobile terminal 14, utilizes the transmission ability of the access point 18-2 present in the communicatable area 12-2, thereby transmitting the special CTS frame to the other access point 18-1 and prohibiting transmission operation.

Figure 14:
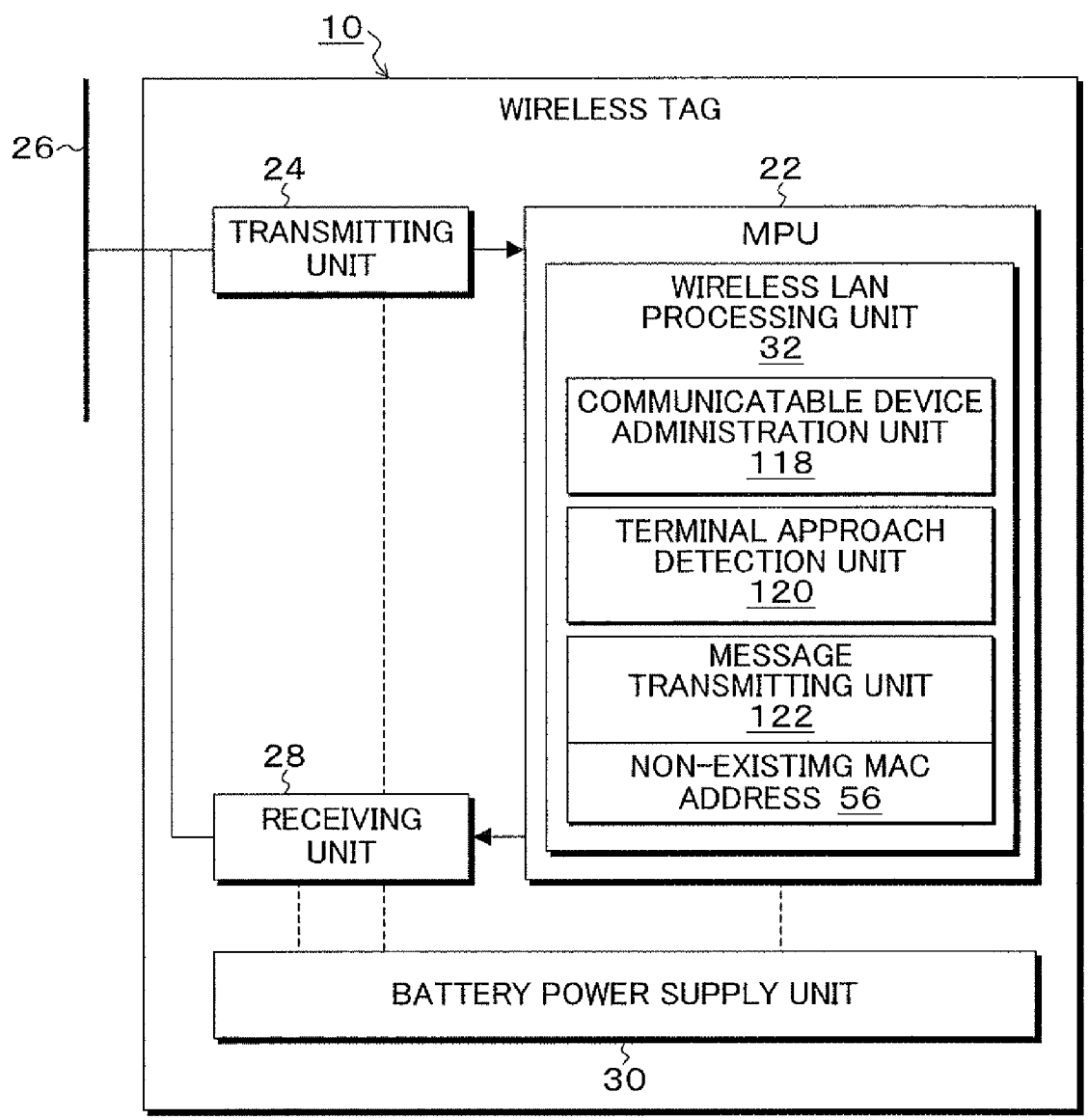
FIG. 14 is a block diagram showing a functional configuration of a wireless tag in the second embodiment.

FIG. 14 is a block diagram showing a functional configuration of the wireless tag 10 in the second embodiment. The wireless tag 10 is composed of the MPU 22, the transmitting unit 24, the antenna 26, the receiving unit 28, and the battery power supply unit 30, and the wireless LAN processing unit 32 is provided in the MPU 22. In the wireless LAN processing unit 32, a communicatable device administration unit 118, a terminal approach detection unit 120, a message transmitting unit 122, and the non-existing address 56 are provided. The communicatable device administration unit 118 recognizes the access point(s) which is a communicatable base station device(s) and registers and administers that in advance. The terminal approach detection unit 120 detects approach of the mobile terminal 14. Upon approach of the mobile terminal 14 in the present embodiment, the RTS frame for approach detection, in which the non-existing MAC address is set as a destination address, is transmitted from the mobile terminal 14 and received by the wireless tag 10 so as to detect the approach. When approach of the mobile terminal 14 is detected, the message transmitting unit 122 transmits the special CTS frame, which is a special transmission request message in which the non-existing MAC address serving as a receiving address which cannot exist in the wireless LAN environment, to the communicatable access point, which is registered in advance, then sets tag, which is determined in advance, stored information in a data frame, and transmits that to the mobile terminal.

Figure 15:
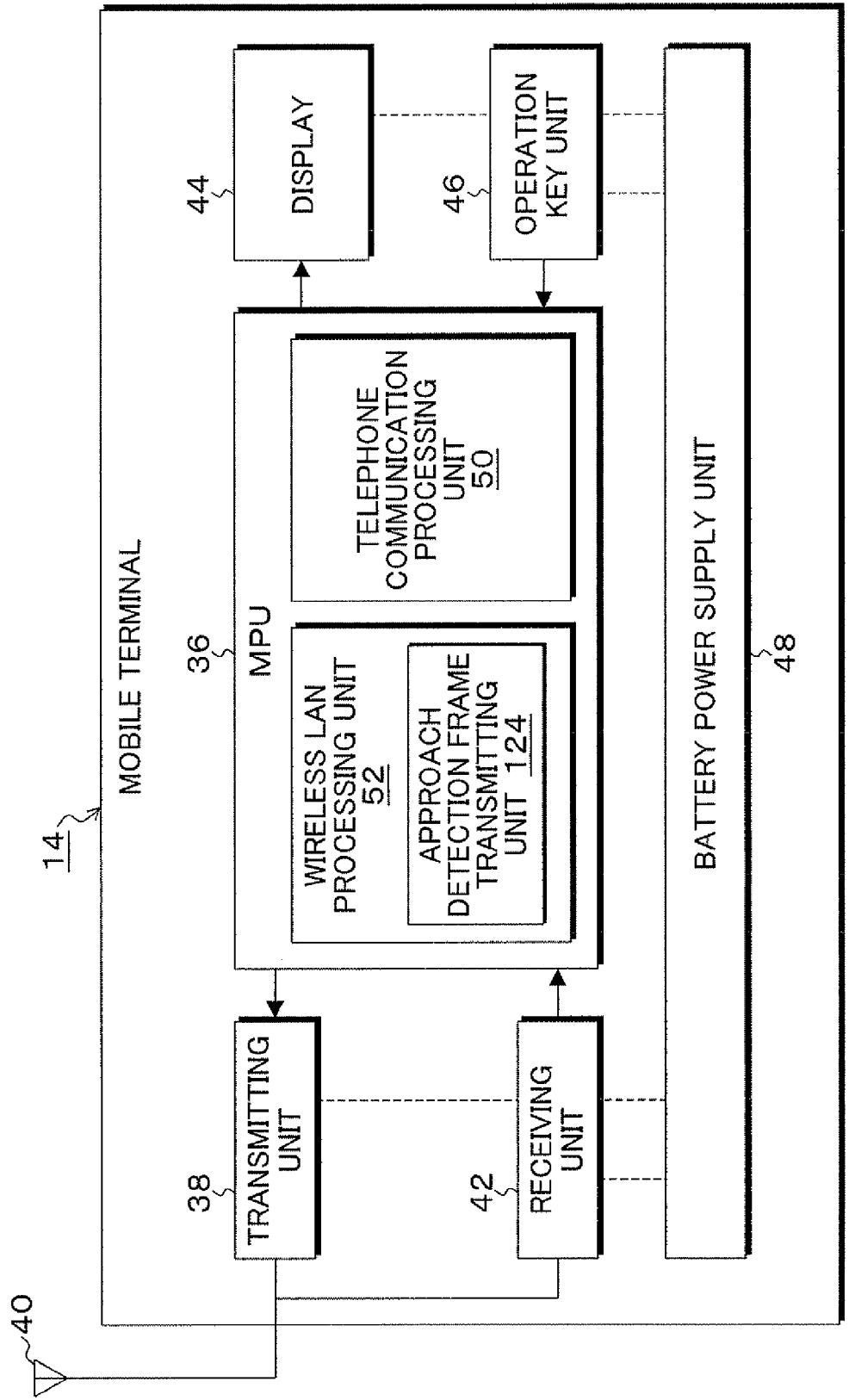
FIG. 15 is a block diagram showing a functional configuration of a mobile terminal in the second embodiment.

FIG. 15 is a block diagram showing a functional configuration of the mobile terminal 14 in the second embodiment. In FIG. 15, the mobile terminal 14 is composed of the MPU 36, the transmitting unit 38, the antenna 40, the receiving unit 42, the display 44, the operation key unit 46, and the battery power supply unit 48. In the MPU 36, the telephone call processing unit 50 and the wireless LAN processing unit 52 are provided. In the wireless LAN processing unit 52, an approach detection frame transmitting unit 124 is provided. The approach detection frame transmitting unit 124 transmits, for example, an approach detection RTS frame 76-2 shown in FIG. 18B corresponding to a data acquisition requesting operation of the operation key unit 46 with respect to the wireless tag. The approach detection RTS frame 76-2 of FIG. 18B has the frame control 92 and the transmission period 94, and the non-existing MAC address 56 is set as a next frame destination address. Furthermore, the frame source address 98 is provided so as to compose the MAC header 84 by them, and the FCS 100 is provided at the end.

Figure 16:
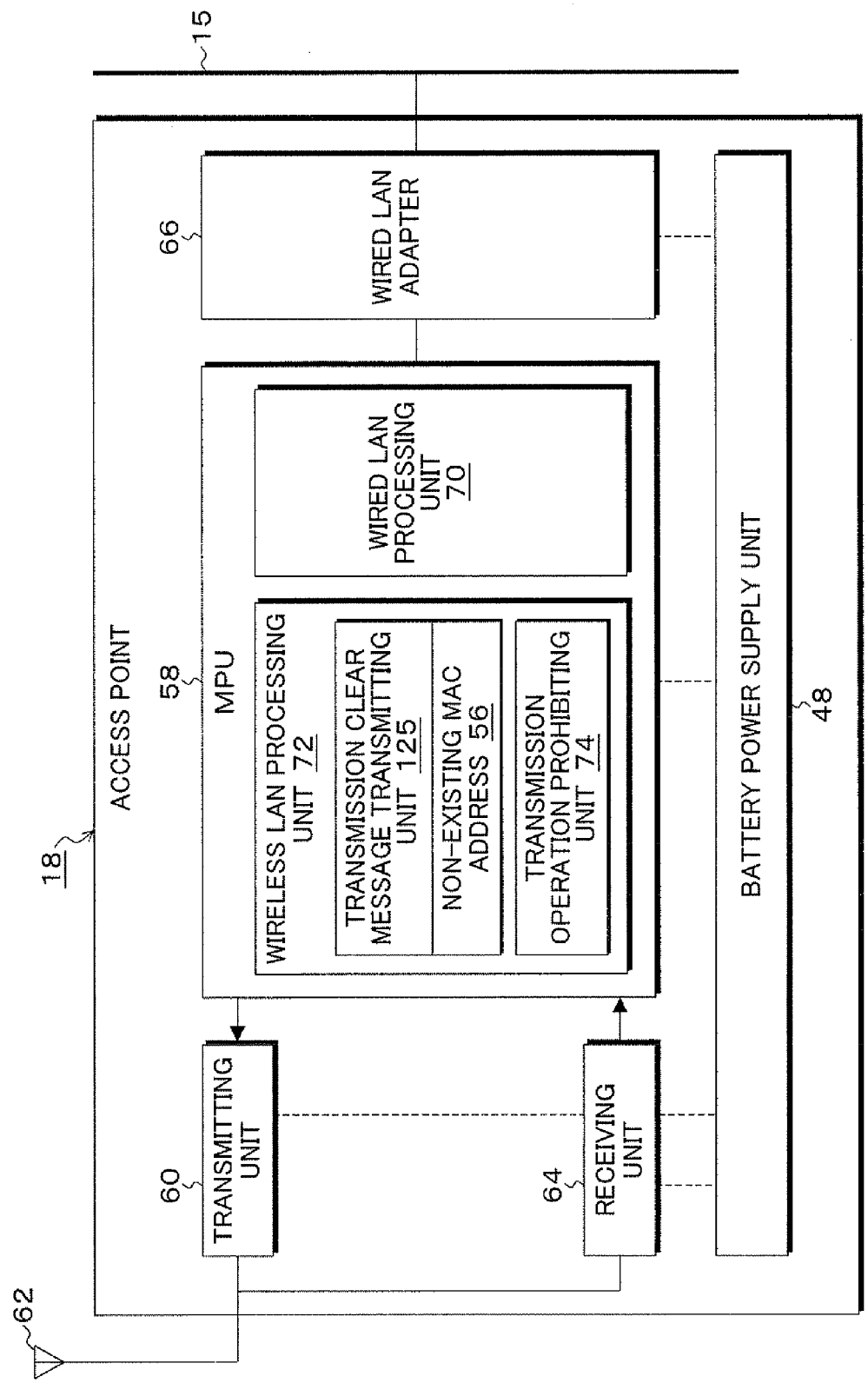
FIG. 16 is a block diagram showing a functional configuration of an access point in the second embodiment.

FIG. 16 is a block diagram showing a functional configuration of the access point 18 which functions as a base station device in the second embodiment. In FIG. 16, the access point 18 is composed of the MPU 58, the transmitting unit 60, the antenna 62, the receiving unit 64, the wired LAN adapter 66, and the battery power supply unit 68. In the MPU 58, the wired LAN processing unit 70 and the wireless LAN processing unit 72 are provided. In the wireless LAN processing unit 72, a transmission clear message transmitting unit 125 and the transmission operation prohibiting unit 74 are provided as functions unique to the second embodiment, and the non-existing MAC address 56 is further set in the transmission clear message transmitting unit 125. When the transmission clear message transmitting unit 125 receives the special RTS frame 76-1 shown in FIG. 18A from the wireless tag 10 shown in FIG. 14, the unit transmits the special CTS frame 78-1 shown in FIG. 8A from other access point. When the transmission operation prohibiting unit 74 receives the special CTS frame 78-1 of FIG. 8A, based on the NAV value set in the transmission period 94 in the frame, the unit prohibits transmission operation during that period.

FIGS. 17A to 17D are a time charts showing data transmission of the second embodiment. When the mobile terminal 14 of FIG. 17A performs a read request for reading the information of the wireless tag in the vicinity thereof by key operation, the mobile terminal 14 transmits the approach detection RTS frame 76-2 shown in FIG. 18B. When this approach detection RTS frame 76-2 is received by the wireless tag 10 of FIG. 17B, the special RTS frame 76-1 having the non-existing MAC address 56 of FIG. 18A is transmitted to the access point 18-2 of FIG. 17C which is registered in advance. The access point 18-2, which has received the special RTS frame 76-1, sets the NAV value, which determines transmission operation prohibited time, in the transmission period 94 shown in FIG. 8A and transmits the special CTS frame 78-1, in which the non-existing MAC address 56 is set as a frame destination address. The special CTS frame 78-1 is received by the mobile terminal 14 of FIG. 17A, the wireless tag 10 of FIG. 17B, and further the other access point 18-1 of FIG. 17D. The other access point 18-1 of FIG. 17D, which has received the special CTS frame 78-1, sets the transmission operation prohibited time T3 based on the NAV value set in the transmission period 94 in the frame and executes transmission operation prohibition 90-2 for the time T3. At the same time, the access point 18-2 of FIG. 17C, which has transmitted the special CTS frame 78-1 also executes the transmission operation prohibition 90-1 for the time T3. Meanwhile, along with reception of the special CTS frame 78-1 the wireless tag 10 of FIG. 17B transmits the data frame 80, in which the information stored in the tag is set as a frame main body (payload), to the mobile terminal 14. When the mobile terminal 14 normally receives the data frame 80 from the wireless tag 10, the terminal transmits the special ACK frame 82-1 shown in FIG. 8B to the wireless tag 10; thus, normal reception termination of the data frame is confirmed, and the series of processes is finished. When the special ACK frame 82-1 cannot be received, the wireless tag 10 performs retransmission of the data frame 80 by the number of times determined in advance, and, along with the retransmission, the time of the transmission operation prohibition 90-1 and 90-2 of the access points 18-2 and 18-1 is also extended.

FIG. 19 is a time chart showing a data transmission process of the second embodiment. In FIG. 19, first of all, in the wireless tag 10, communicatable access points are registered and administered in step S101. When key operation or the like for acquiring the information of the wireless tag 10 is performed on the mobile terminal 14 in this state, the approach detection RTS frame is transmitted in step S1, the wireless tag 10 receives the approach detection RTS frame, approach of the mobile terminal is detected in step S102, and the special RTS frame of the non-existing MAC address is transmitted to the access point 18-2, which is registered and administered in step S101, in step S103. The access point 18-2 transmits the special CTS frame of the non-existing MAC address in step S201 and then prohibits transmission operation in step S202. The wireless tag 10 receives the special CTS frame from the access point 18-2, and then transmits a data frame, in which read tag stored information is set, in step S104; the mobile terminal 14 receives the data frame in step S2 and transmits the special ACK frame of the non-existing MAC address in step S3. When the wireless tag 10 receives the special ACK frame from the mobile terminal 14, the tag recognizes transmission completion of the data frame and terminates the process in step S105. Meanwhile, in step S4, the mobile terminal 14 performs data processing for the data frame received from the wireless tag 10 and, for example, displays the position or commercial product information. Meanwhile, in the access points 18-2 and 18-1, prohibition of transmission operation is executed in steps S202 and S301 based on the special CTS frame having the non-existing MAC address, elapse of the transmission planned time in the frame is checked in steps S203 and S302, and, when the transmission planned time elapses, the transmission operation prohibition is cancelled in steps S204 and S303, thereby returning to normal operation. Therefore, during the period in which the transmission process of the data frame is performed between the wireless tag 10 and the mobile terminal 14, radio waves are not transmitted from the access points 18-2 and 18-1, and the data frame can be reliably transmitted to the mobile terminal 14 even by the weak radio wave of the wireless tag 10 without being interrupted.

Figure 20:
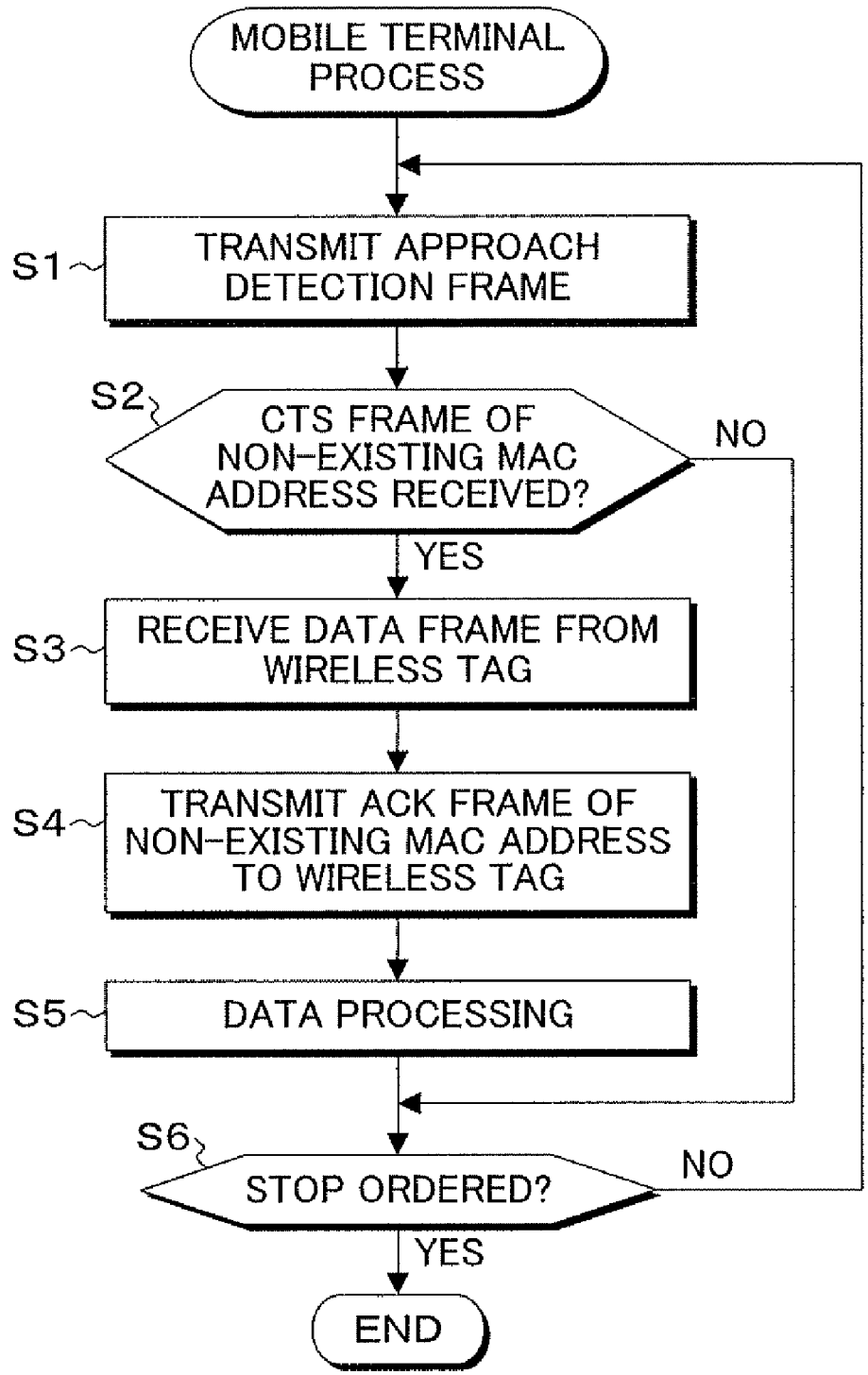
FIG. 20 is a flow chart of a mobile terminal process in the second embodiment.

FIG. 20 is a flow chart of the mobile terminal process in the second embodiment, and it will be described below with reference to FIG. 15. In the mobile terminal process of FIG. 20, when a request for reading the data of the wireless tag, which is present in the vicinity, is generated by predetermined key operation or the like of the operation key unit 46 in step S1, the approach detection frame transmitting unit 124 transmits, for example, the approach detection RTS frame 76-2 shown in FIG. 18B in step S1. Subsequently, when reception of the special CTS frame 78-1 shown in FIG. 8A having the non-existing MAC address from the access point is determined in step S2, the data frame is received from the wireless tag in step S3, the special ACK frame of the non-existing MAC address is transmitted to the wireless tag in step S4, and data processing of the received data frame is performed in step S5 so as to, for examples display the position information or commercial product information. Such processes of steps S1 to S5 are repeated until there is a stop order in step S6.

Figure 21:
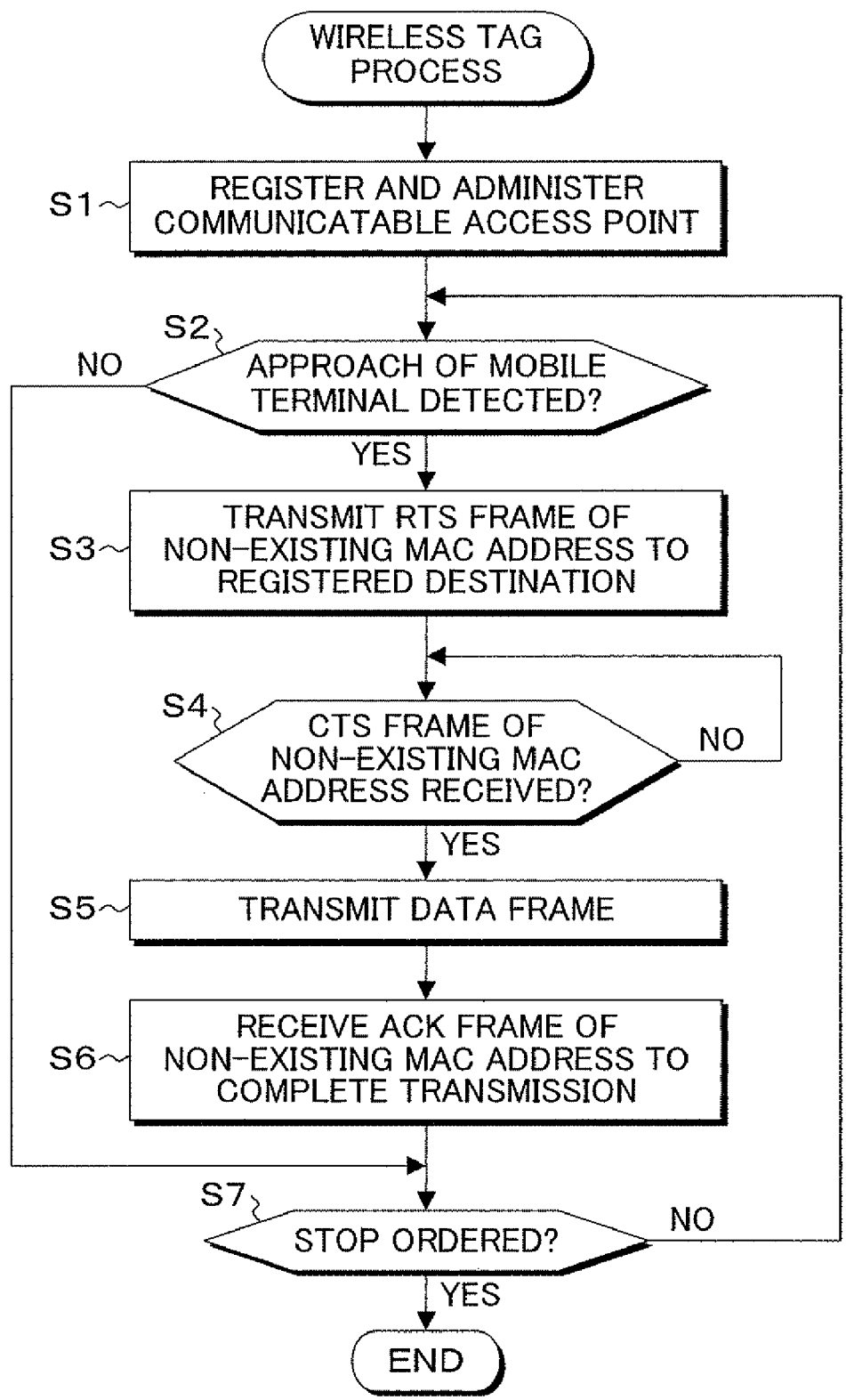
FIG. 21 is a flow chart of a wireless tag process in the second embodiment.

FIG. 21 is a flow chart of the wireless tag process in the second embodiment, and it will be described below with reference to FIG. 14. In the wireless tag process of FIG. 21, first of all, in step S1, the communicatable device administration unit 118 recognizes and registers/administers a communicatable access point(s). Subsequently, when the terminal approach detection unit 120 detects approach of the mobile terminal by reception of, for example, the approach detection RTS frame 76-2 of FIG. 18B in step S2, the special RTS frame 76-1 of FIG. 18A having the non-existing is transmitted to the access point, which is the registered destination, in step S3. Subsequently, reception of the special CTS frame 78-1 of FIG. 8A having the non-existing MAC address from the access point, to which the special RTS frame is transmitted, is determined in step S4, and the data frame, in which the tag stored information is set, is transmitted in step S5. Subsequently, in step S6, when the special ACK frame 82-1 shown in FIG. 18B having the non-existing MAC address is received, the transmission process is terminated. Such processes of steps S2 to S6 are repeated until there is a stop order in step S7.

Figure 22:
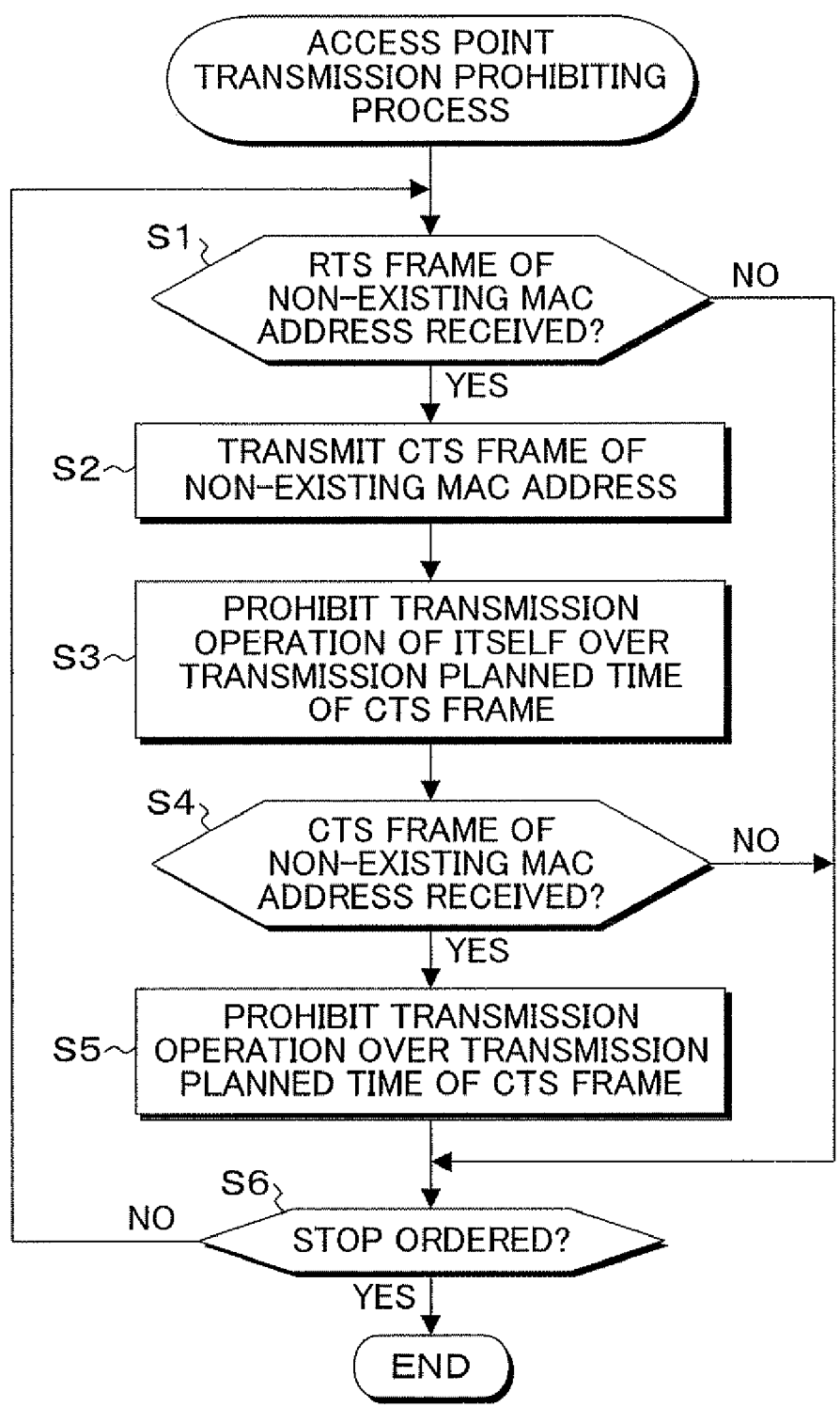
FIG. 22 is a flow chart of an access point transmission prohibiting process in the second embodiment.

FIG. 22 is a flow chart of the access point transmission prohibition process in the second embodiment, and it will be described below with reference to FIG. 16.

In FIG. 22, in the access point transmission prohibition process, when reception of the special RTS frame 76-1 of FIG. 18A having the non-existing MAC address from the wireless tag is determined in step S1, the process proceeds to step S2, in which the special CTS frame 78-1 having the non-existing MAC address 56 shown in FIG. 8A is transmitted. Subsequently, in step S3, the transmission operation of the access point per se is prohibited for the transmission planned time of the transmitted special CTS frame, in other words, for the time based on the NAV value set in the transmission period 94 of FIG. 8A. Meanwhile, when the special CTS frame of the non-existing MAC address is received from the other access point in step S4, the process proceeds to step 5, in which transmission operation is similarly prohibited for the transmission planned time of the special CTS frame. Such processes of steps S1 to S5 are repeated until there is a stop order in step S6. Note that, in the second embodiment of FIG. 13, the wireless tags 10-1 and 10-2 have to be communicatable with the access points 18-1 and 18-2, respectively; and, therefore, the installation areas of the wireless tags 10-1 and 10-2 are restricted to the ranges in which the access points 18-1 and 18-2 are included in the communicatable areas 12-1 and 12-2, respectively. This restriction can be eliminated by temporarily increasing the transmission power of the wireless tag 10-1 or 10-2 when approach of the mobile terminal is detected by the wireless tag 10-1 or 10-2 and the special RTS frame is to be transmitted to the access point 18-1 or 18-2, thereby expanding the communicatable area 12-1 or 12-2.

Figure 23:
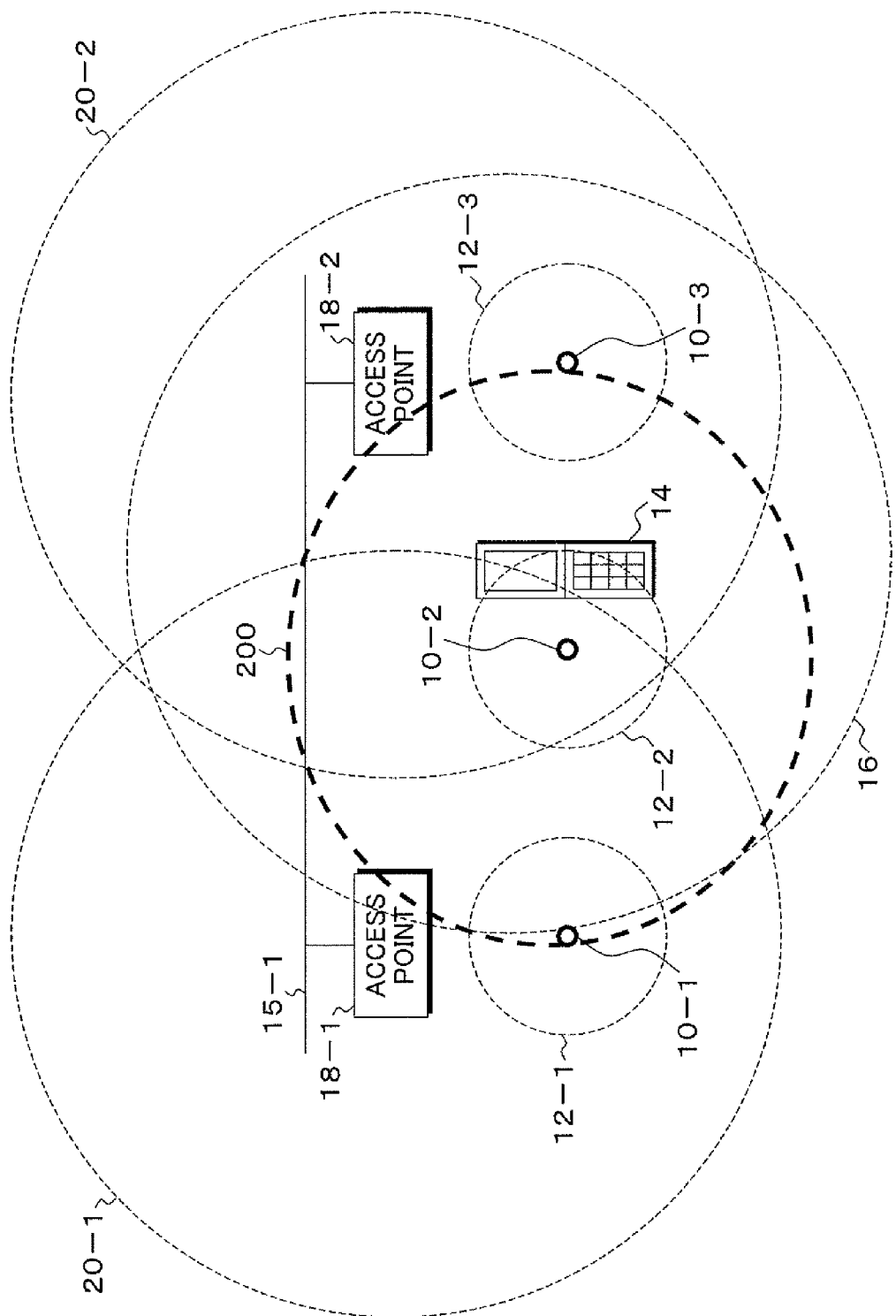
FIG. 23 is an explanatory diagram of a system configuration showing a third embodiment of the present invention.

FIG. 23 is an explanatory diagram of a system configuration showing a third embodiment of a wireless communication system corresponding to a third invention of the present embodiment. In the third embodiment of FIG. 23, a wireless LAN environment is formed by the communicatable areas 20-1 and 20-2 of the access points 18-1 and 18-2 serving as base station devices connected via the wired LAN 15, the wireless tags 10-1 to 10-3, which perform communication by weak radio waves, are disposed therein, and, furthermore, the mobile terminal 14, which is communicatable with other devices via the access points 18-1 and 18-2, reads the information of the wireless tags 10-1 to 10-3, and is possessed by a user is present. In such a wireless LAN environment, in the third embodiment, for example, the wireless tag 10-2 temporarily switches the original transmission power of the wireless tag 10-2 outputting weak radio waves to large transmission power at periodical timing, thereby extending the communicatable area 12-2 to a communicatable area 200; and, in this transmission power increased state, the tag transmits a special transmission clear message including a receiving address, which cannot exist in the wireless LAN environment, and transmission planned time, specifically, a special CTS frame including a non-existing MAC address, which cannot exist in the wireless LAN environment, and transmission planned time. The access points 18-1 and 18-2, which have received the special CTS frame from the wireless tag 10-2, prohibit transmission operation for the transmission planned time in the frame. During that period, in the state in which the transmission power is returned to the original state, the wireless tag 10-2 transmits a data frame, in which stored information is set, from the wireless tag 10-2 to the mobile terminal 14.

Figure 24:
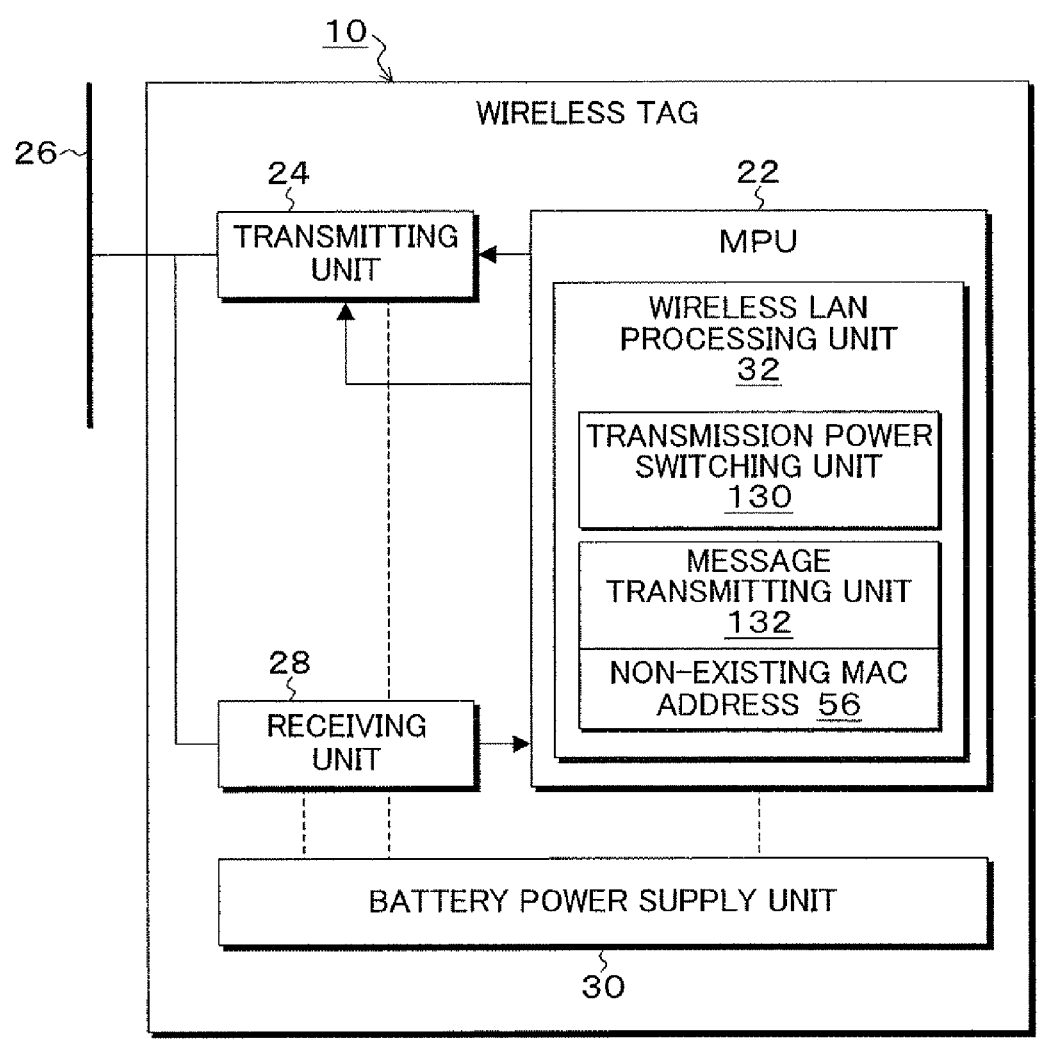
FIG. 24 is a block diagram showing a functional configuration of a wireless tag in the third embodiment.

FIG. 24 is a block diagram showing a functional configuration of the wireless tag 10 in the third embodiment, wherein the wireless tag 10 is composed of the MPU 22, the transmitting unit 24, the antenna 26, the receiving unit 28, and the battery power supply unit 30. The wireless LAN processing unit 32 is provided in the MPU 22; and, as the functions thereof, a transmission power switching unit 130 and a message transmitting unit 132 are provided, and the non-existing MAC address 56 is set in the message transmitting unit 132. The transmission power switching unit 130 switches the transmission power, which emits normal weak radio waves, to large transmission power, which ensures the communicatable area necessary for transmission operation prohibition of the access points or the mobile terminal present in the range that affects the communication of the wireless tag, at periodical timing and transmits the special CTS frame 78-1 shown in FIG. 8A. In this special CTS frame 78-1, a NAV value, which sets the transmission operation prohibiting period in the transmission prohibiting period 94, is set, and the non-existing MAC address 56 is set at the position of the frame destination address.

Figure 25:
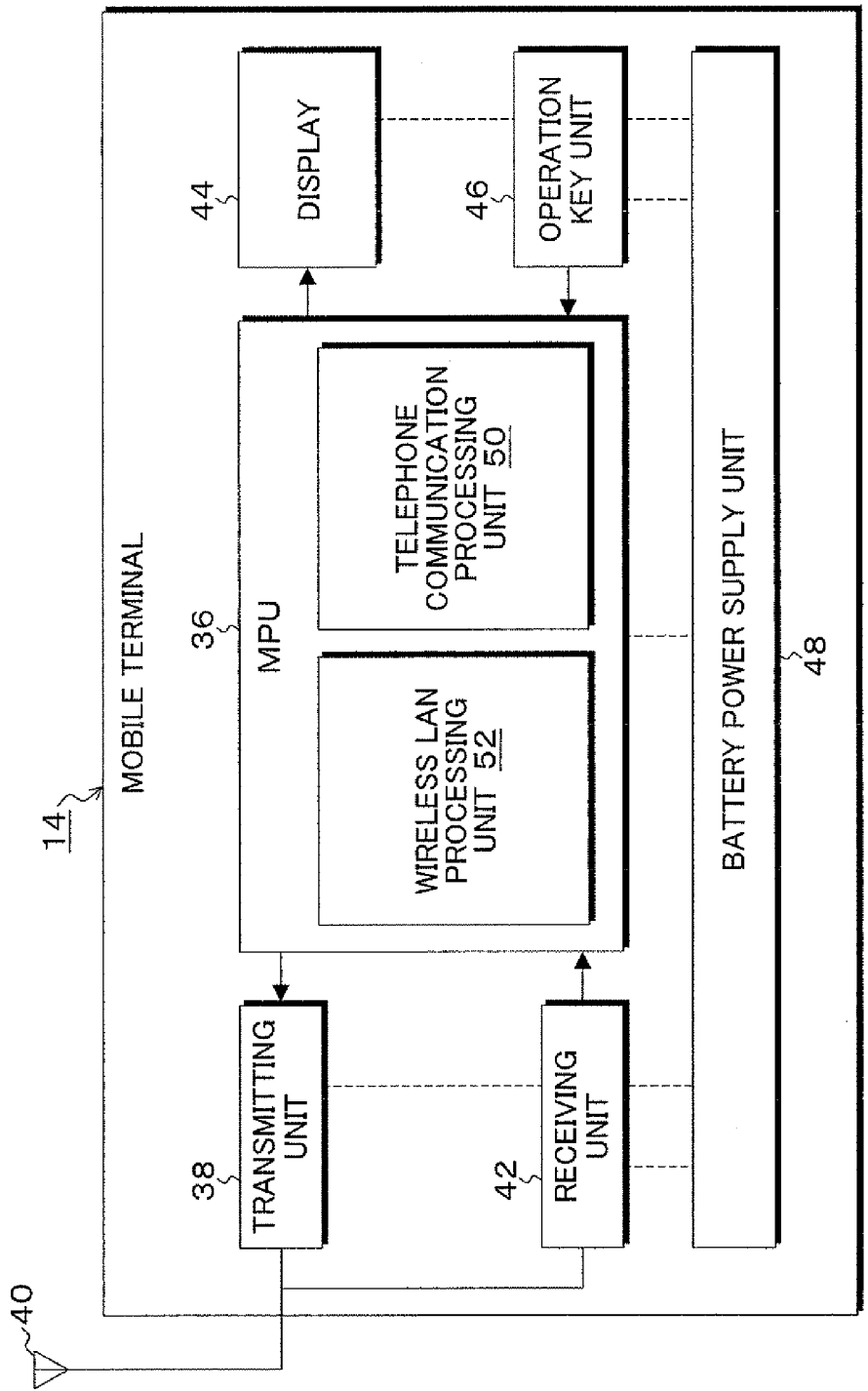
FIG. 25 is a block diagram showing a functional configuration of a mobile terminal in the third embodiment.

FIG. 25 is a block diagram showing a functional configuration of the mobile terminal 14 in the third embodiment, and the configuration and the operation thereof is same as that of the mobile terminal 14 of the second embodiment shown in FIG. 15 except for the approach detection frame transmitting unit 124.

Figure 26:
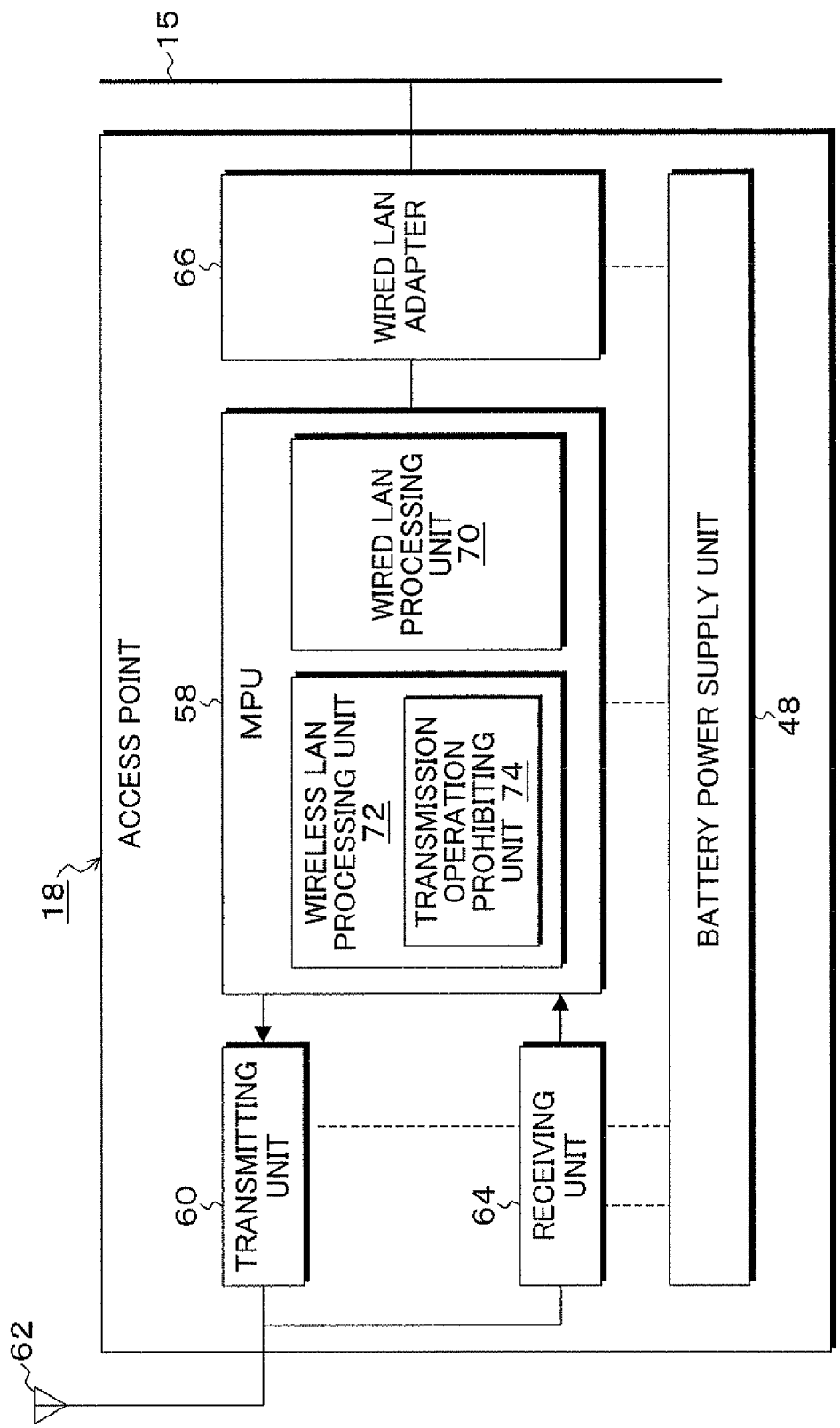
FIG. 26 is a block diagram showing a functional configuration of an access point in the third embodiment.

FIG. 26 is a block diagram showing a functional configuration of the access point 18 in the third embodiment; wherein, it is composed of the MPU 58, the transmitting unit 60, the antenna 62, the receiving unit 64, the battery power supply unit 68, and the wired LAN adapter 66, and the wired LAN processing unit 70 and the wireless LAN processing unit 72 are provided in the MPU 58. Furthermore, in the wireless LAN processing unit 72, the transmission operation prohibiting unit 74 is provided as a processing function. When the special CTS frame 78-1 shown in FIG. 5A is received from the wireless tag 10 of FIG. 24 along with the switching that increases the transmission power, the transmission operation prohibiting unit 74 prohibits transmission operation for the transmission operation prohibited time T3 based on the NAV value set in the transmission period 94 in the frame.

Figure 27:
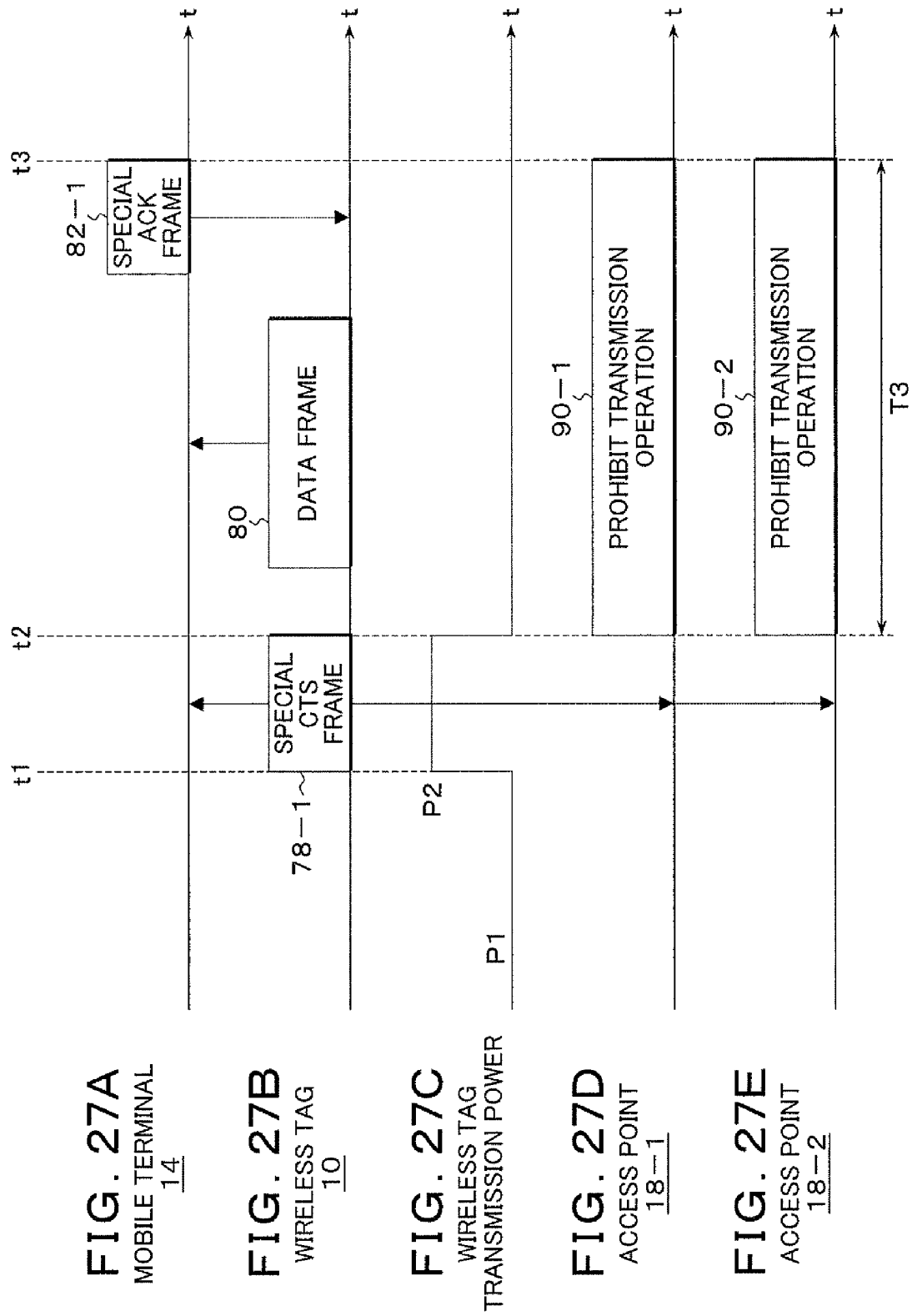
FIGS. 27A to 27E are time charts showing data transmission in a MAC layer according to the third embodiment.

FIGS. 27A to 27E are time charts showing data transmission of the third embodiment. As shown in FIG. 27C, at the time t1 which is periodical transmission timing, the wireless tag 10 switches the transmission power of the wireless tag 10 from transmission power P1 in a normal case which emits weak radio waves to transmission power P2 which is sufficiently large so that it is communicatable with the access points 18-1 and 18-2, which are present in the vicinity thereof. In this state in which it is switched to the transmission power P2, the special CTS frame 78-1 in which a NAV value is set in the transmission period 94 shown in FIG. 8A and the non-existing MAC address 56 is set as the frame destination address is transmitted as shown in FIG. 27B. Since the wireless tag 10 has increased the transmission power thereof from the transmission power P1 in a normal case to the large transmission power P2, the special CTS frame 78-1 can be sent to, as a matter of course, the mobile terminal 14 of FIG. 27A and also to the access points 18-1 and 18-2 of FIGS. 27D and 27E with which normally communication cannot be performed. Therefore, the access points 18-1 and 18-2 receive the special CTS frame 78-1 transmitted along with switch of the transmission power P2 of the wireless tag 10, set the transmission operation prohibited time T3 according to the NAV value set in the transmission period 94 in the frame, and executes the transmission operation prohibition 90-1 and 90-2 for the time T3. At the timing of this transmission operation prohibited time T3, the wireless tag 10 transmits the data frame 80, in which tag stored information is set, to the mobile terminal 14 by the weak radio wave of the normal transmission power P1. The mobile terminal 14 normally receives the data frame 80 without being interrupted by the radio waves from the access points 18-1 and 18-2 and transmits the special ACK frame 82-1 shown in FIG. 5B; and the wireless tag 10 receives that, thereby terminating the series of data transmission.

Figure 28:
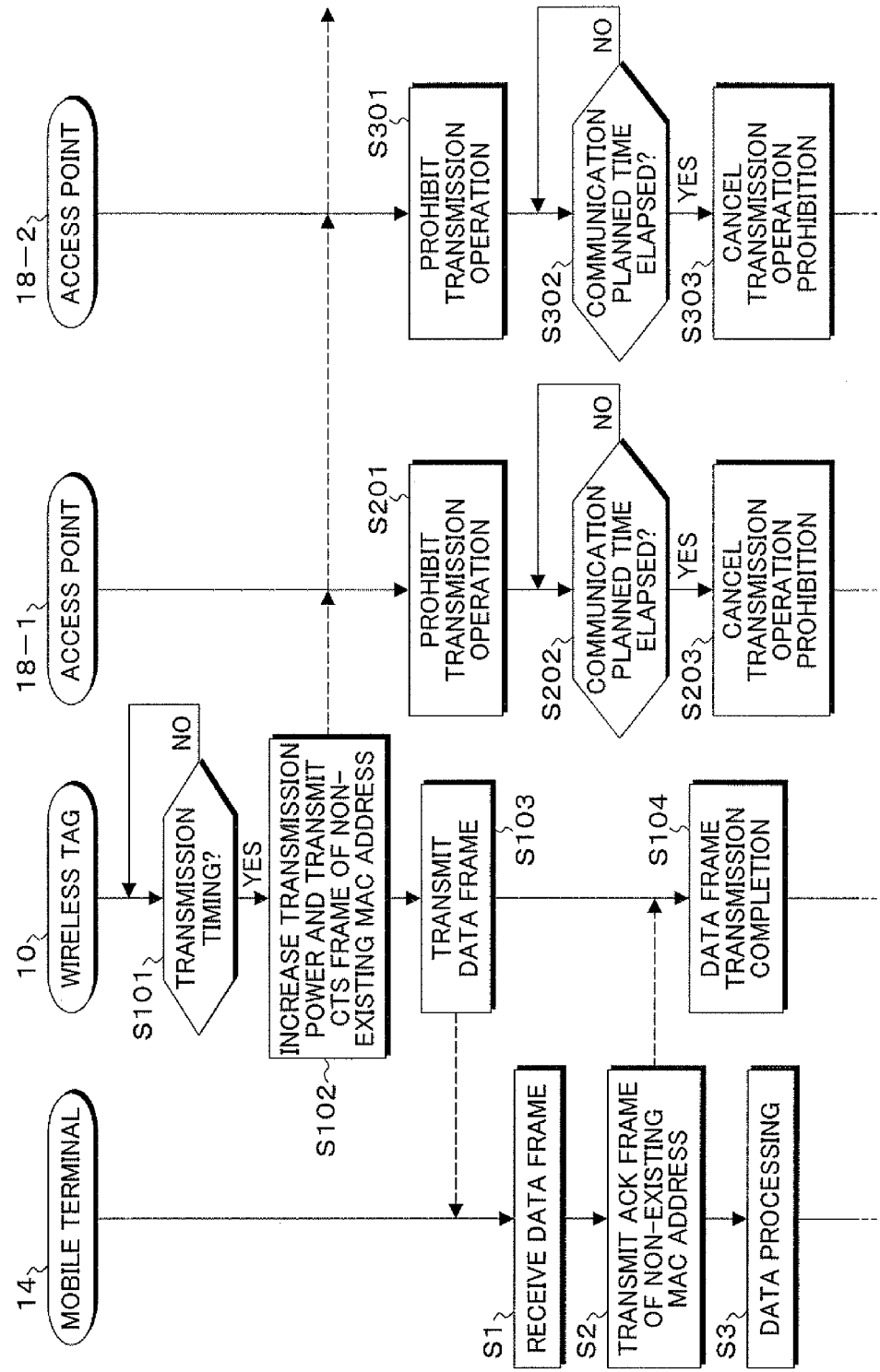
FIG. 28 is a time chart showing a data transmission process of the third embodiment.

FIG. 28 is a time chart showing a data transmission process of the third embodiment. In FIG. 28, when the wireless tag 10 determines reach to periodical transmission timing in step S101, the wireless tag temporarily increases the transmission power and transmits the special CTS frame of the non-existing MAC address in step S102. The special CTS frame transmitted along with the power increase of the wireless tag 10 is received by the access points 18-1 and 18-2, the transmission operation thereof is prohibited in steps S201 and S301, and elapse of the communication planned time based on the NAV value in the frame is monitored in steps S202 and S302. The wireless tag 10 transmits the data frame, in which tag information is read and set, in step S103 during the transmission operation of the access points 18-1 and 18-2. The mobile terminal 14 receives the data frame in step S1 and transmits the special ACK frame of the non-existing MAC address in step S2; the wireless tag 10 receives that, thereby completing the data frame transmission in step S104. In addition, the mobile terminal 14 performs data processing such as position display or commercial product information display for the data acquired from the data frame from the received wireless tag 10 in step S3. Meanwhile, in the access points 18-1 and 18-2, when elapse of the communication planned time is determined in steps S202 and S302, they proceed to steps S203 and S303 in which transmission operation prohibition is cancelled, thereby returning to normal operation.

Figure 29:
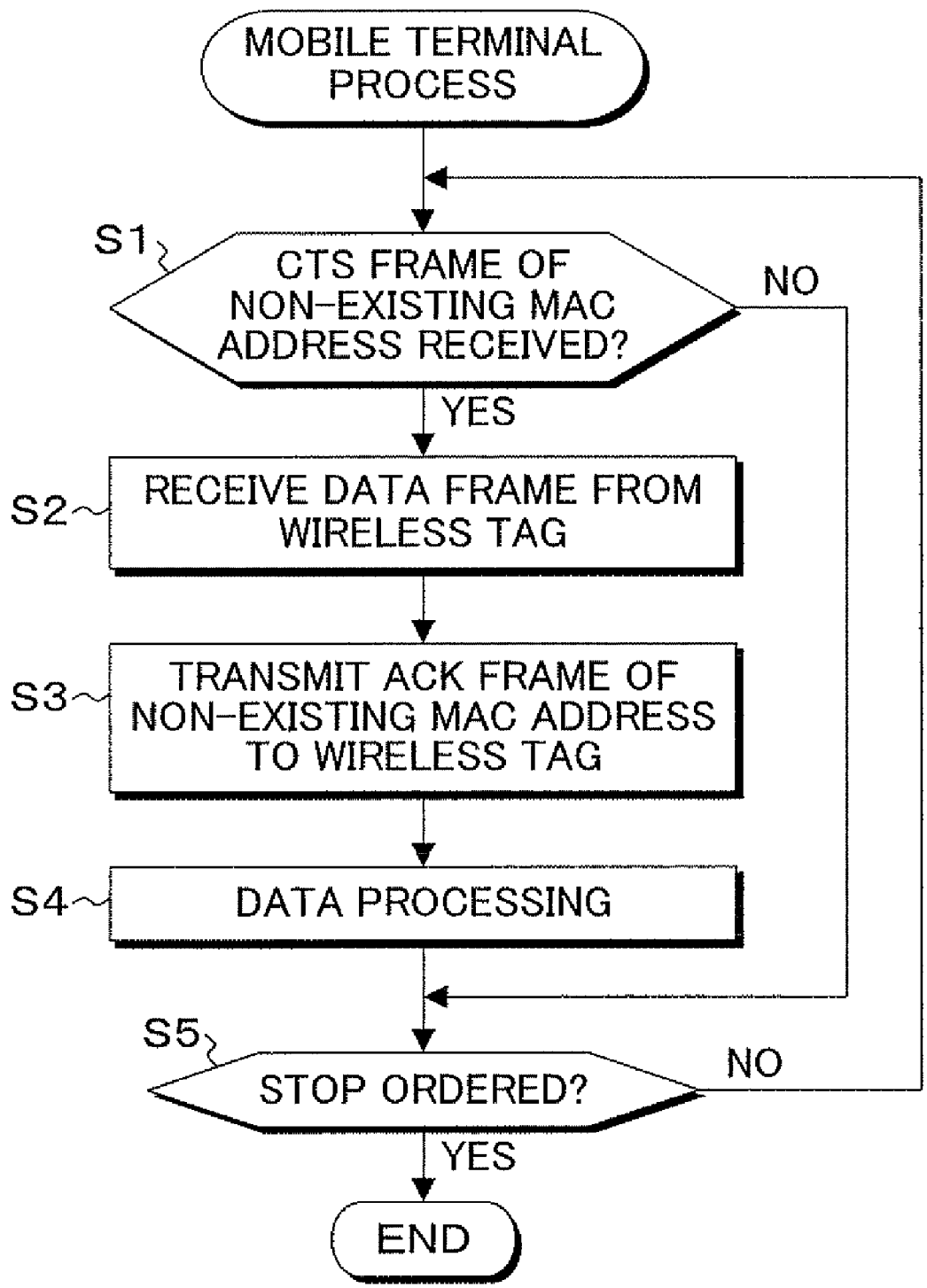
FIG. 29 is a flow chart of a mobile terminal process in the third embodiment.

FIG. 29 is a flow chart of the mobile terminal process in the third embodiment, and it will be described below with reference to FIG. 25. In the mobile terminal process of FIG. 29, when reception of the special CTS frame having the non-existing MAC address along with the power increase of the wireless tag 10 is determined in step S1, the data frame transmitted from the wireless tag is received in step S2, the special ACK frame 82-1 of FIG. 8B having the non-existing MAC address is transmitted to the wireless tag in step S3, and data processing is performed for the received data frame in step S4. Such processes of steps S1 to S4 are repeated until there is a stop order in step S6.

Figure 30:
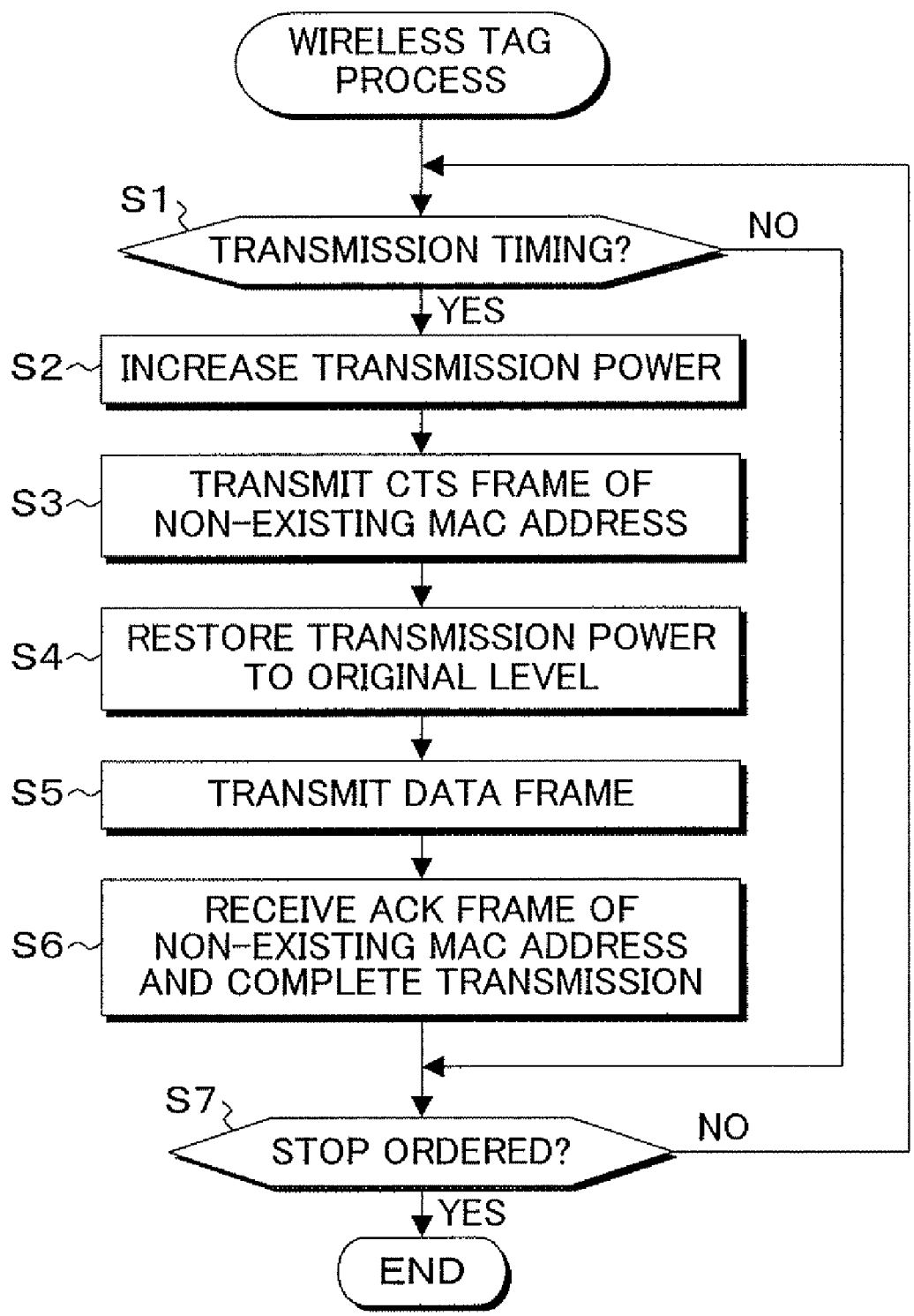
FIG. 30 is a flow chart of a wireless tag process in the third embodiment.

FIG. 30 is a flow chart of the wireless tag process in the third embodiment, and it will be described below with reference to FIG. 24. In the wireless tag process of FIG. 30, when periodical transmission timing is determined in step S1, the process proceeds to step S2 in which the transmission power is increased. In step S3, the special CTS frame 78-1 of FIG. 8A having the non-existing MAC address is transmitted, and the transmission power is returned to the original state in step S4 after the transmission. Subsequently in step S5, the data frame in which the read tag information is set is transmitted. Subsequently in step S6, the special ACK frame 82-1 shown in FIG. 8B having the non-existing MAC address from the mobile terminal 14, which is the data frame transmission destination, is received, and the series of the transmission processes is completed. Such processes of steps S1 to S6 are repeated until there is a stop order in step S7.

Figure 31:
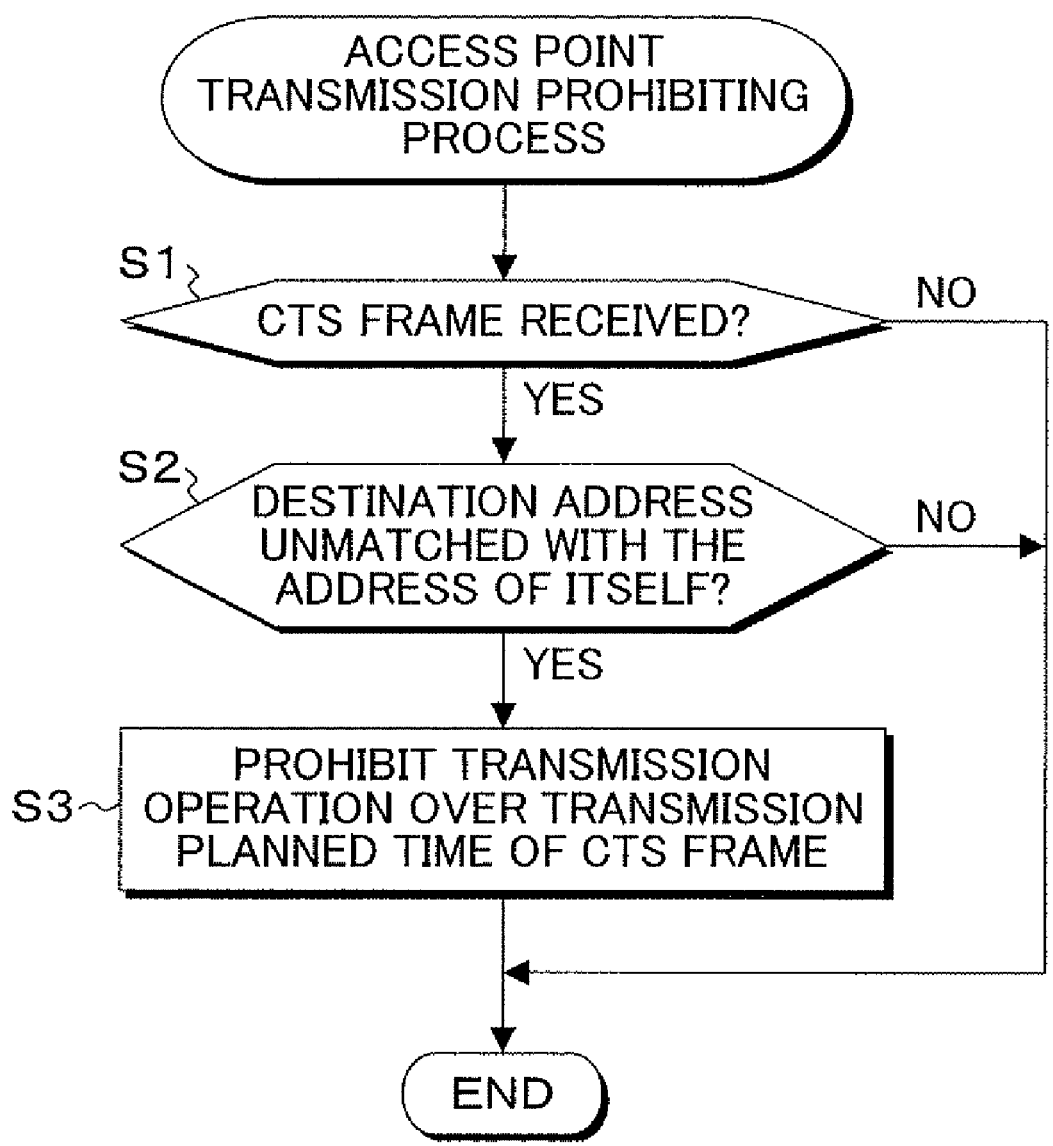
FIG. 31 is a flow chart of an access point transmission prohibiting process in the third embodiment.

FIG. 31 is a flow chart of the access point transmission prohibiting process in the third embodiment, and it will be described below with reference to FIG. 26. In the access point transmission prohibiting process of FIG. 31, reception of the CTS frame is determined in step S1. This CTS frame includes both the normal CTS frame 78 shown in FIG. 6B and the special CTS frame 78-1 shown in FIG. 8 which is unique to the present embodiment. When reception of the CTS frame is determined in step S1, the process proceeds to step S2 in which whether the destination address is unmatched with the address of the access point per se is checked. When they are unmatched, the process proceeds to step S3 in which the transmission operation thereof is prohibited for the transmission planned time of the CTS frame, in other words, the transmission prohibited time determined by the NAV value in the frame. In this process, also in the case in which the frame destination address is the non-existing MAC address 56 by the special CTS frame 78-1, similarly, transmission operation is prohibited for the transmission planned time in the frame in step S3. Note that the case in which the approach detection RTS frame 76-2 shown in FIG. 18B is transmitted from the mobile terminal 14 is transmitted for approach detection of the mobile terminal 14 with respect to the wireless tag 10 in the above described second embodiment is taken as an example; however, frame transmission for approach detection is not limited thereto, and an arbitrary control frame which can determine approach of the wireless tag can be used. The above described embodiments take IEEE 802.11g as an example of a wireless LAN environment; however, even in other standardized wireless LAN environments, they can be similarly carried out when messages or frames using the receiving addresses which cannot exist in the utilized environment. The above described embodiments take the case, in which position information or commercial product information is stored in the wireless tags and read and displayed by the mobile terminal, as an example; however, how the wireless tags are to be disposed in the mobile environment or what kind of information is to be stored in the wireless tags is not limited by the present embodiments, and arbitrary modes can be employed in accordance with needs. The present invention is not limited to the above described embodiments but includes arbitrary modifications that do not impair the objects and advantages thereof. The present invention is also not limited by the numerical values shown in the above described embodiments.

What is claimed is:

1. A non-transitory computer-readable storage medium which stores a program allowing a computer of a mobile terminal device communicatable by a frequency band of a wireless network with one or a plurality of weak radio wave communication device which is disposed in a predetermined area in a dispersed manner and transmits/receives information by wireless communication of weak transmission power which is smaller than the transmission power of the mobile terminal device to function as
   a transmission clear message transmitting unit which sets and transmits a predetermined receiving address, which is not used by a communication device in the predetermined area, as a receiving address of a special transmission clear message, which is a message that stops transmission of other communication device other than the receiving address, upon communication with the weak radio wave communication device, and
   a receiving unit which receives information, which is transmitted after transmission from the transmission clear message transmitting unit, as information from the weak radio wave communication device.

2. The storage medium according to claim 1, wherein the predetermined receiving address, which is not used by the communication device in the predetermined area, comprises
   a particular MAC address which is determined in advance,
   a MAC address of an already discarded communication device,
   an unused MAC address which is newly reserved, or
   a MAC address of a communication device which does not exist in the utilized environment.

3. The storage medium according to claim 2, wherein the transmission clear message transmitting unit of the mobile terminal device transmits a special clear to send frame including a predetermined receiving MAC address, which is not used by the communication device in the predetermined area, and transmission planned time when communicating with the weak radio wave communication device, and
   the message responding unit of the weak radio wave communication device transmits predetermined information, which is determined in advance, when receiving the special clear to send frame.

4. The storage medium according to claim 1, wherein the transmission clear message transmitting unit of the mobile terminal device transmits a special clear to send frame including a predetermined receiving MAC address, which is not used by the communication device in the predetermined area, and transmission planned time when communicating with the weak radio wave communication device, and
   the message responding unit of the weak radio wave communication device transmits predetermined information, which is determined in advance, when receiving the special clear to send frame.

5. A wireless communication system comprising
   a mobile terminal device, which is communicatable in a frequency band of a wireless network and transmits/receives information by wireless communication, and
   one or a plurality of weak radio wave communication device, which is disposed in a predetermined area in a dispersed manner and transmits/receives information by wireless communication of weak transmission power smaller than the transmission power of the mobile terminal device; wherein,
   in the mobile terminal device,
   a transmission clear message transmitting unit which sets and transmits a predetermined receiving address, which is not used by a communication device in the predetermined area, as a receiving address of a special transmission clear message, which is a message that stops transmission of other communication device other than the receiving address, upon communication with the weak radio wave communication device is provided, and,
   in the weak radio wave communication device,
   a message responding unit which transmits predetermined information, which is determined in advance, to the mobile terminal device when the special transmission clear message to the predetermined receiving address, which is not used by the communication device in the predetermined area, is received is provided.

6. The wireless communication system according to claim 5, wherein
   the predetermined area is a wireless local area network environment in which the base station device is installed as an access point;
   each of the mobile terminal device and the weak power communication device has a circuit function communicatable in the wireless local area network; and
   the predetermined receiving address, which is not used by the communication device in the predetermined area, is
   a particular MAC address which is determined in advance,
   a MAC address of an already discarded communication device,
   an unused MAC address which is newly reserved, or
   a MAC address of a device which is not used by the communication device in the predetermined area.

7. The wireless communication system according to claim 6, wherein
   the transmission clear message transmitting unit of the mobile terminal device transmits a clear to send frame including a predetermined receiving MAC address, which is not used by the communication device in the predetermined area, and transmission planned time when communicating with the weak radio wave communication device; and the message responding unit of the weak radio wave communication device transmits predetermined information, which is determined in advance, when receiving the special clear to send frame.

8. A weak radio wave communication device, which is disposed in a dispersed manner in a utilization environment of a wireless network, in which a base station device and a mobile terminal device which transmits/receives information by wireless communication is present, and transmits/receives information by wireless communication of weak transmission power smaller than the transmission power of the base station device and the mobile terminal device, the weak radio wave communication device comprising a message responding unit which transmits predetermined information, which is determined in advance, within transmission planned time when receiving a special transmission clear message including a predetermined receiving address, which is not used by a communication device in the utilization environment, and the transmission planned time from the mobile terminal device, wherein the special transmission clear message is a message that stops transmission of other communication device other than the receiving address during the transmission planned time.

9. A mobile terminal device which is a device which transmits/receives information by wireless communication while moving in a utilization environment of a wireless network in which a base station device, which transmits/receives information by wireless communication, and a weak radio wave communication device, which transmits/receives information by wireless communication of weak transmission power smaller than the transmission power of the base station device are present, the mobile terminal device comprising a transmission clear message transmitting unit which transmits a special transmission clear message including a predetermined receiving address, which is not used by a communication device in the utilization environment, and transmission planned time when acquiring information from the weak radio wave communication device, wherein the special transmission clear message is a message that stops transmission of other communication device other than the receiving address during the transmission planned time.

10. A wireless communication program which causes a computer of a base station device which relays wireless communication to a wired network system to function as a transmission clear message transmitting unit which transmits a special transmission clear message including a receiving address, which cannot exist in a utilization environment, and transmission planned time when receiving a special communication requesting message from a weak radio wave communication device and a transmission operation prohibiting unit which prohibits transmission operation for the transmission planned time in the message when receiving the special transmission clear message.

11. A wireless communication system comprising a base station device and a mobile terminal device which transmit/receive information by wireless communication and a weak radio wave communication device which is disposed in a utilization environment in a dispersed manner and transmits/receives information by wireless communication of weak transmission power smaller than the transmission power of the base station device and the mobile terminal device; wherein the weak radio wave communication device has a communicatable device administration unit which registers and administers the communicatable base station device in advance or performs administration by confirming and registering the communicatable base station device periodically and a transmission requesting message transmitting unit which transmits a special transmission requesting message including a receiving address, which cannot exist in the utilization environment, and then transmits information, which is determined in advance, to the mobile terminal device when approach of the mobile terminal device is detected; and the base station device has a transmission clear message transmitting unit which transmits a special transmission clear message including the receiving address, which cannot exist in the utilization environment, and transmission planned time when receiving the special communication requesting message from the weak radio wave communication device and a transmission operation prohibiting unit which prohibits transmission operation for the transmission planned time in the message when receiving the special transmission clear message.

12. A weak radio wave communication device which is a device which is disposed in a dispersed manner in a utilization environment of a wireless network, in which a base station device which transmits/receives information by wireless communication and a mobile terminal device which transmits/receives information by wireless communication are present, and transmits/receives information by wireless communication of weak transmission power smaller than the transmission power of the base station device and the mobile terminal device, the weak radio wave communication device comprising a communicatable device administration unit which registers and administers the communicatable base station device in advance or performs administration by confirming and registering the communicatable base station device periodically and a transmission requesting message transmitting unit which transmits a special transmission requesting message including a transmission node address, which cannot exist in the utilization environment, to the communicatable base station device when approach of the mobile terminal device is detected, causes the base station device to transmit a special transmission clear message including a receiving address, which cannot exist in the utilization environment, and transmission planned time, and then transmits information, which is determined in advance, to the mobile terminal device.

13. A base station device which is a device which is fixedly disposed in a utilization environment of a wireless network, in which a mobile terminal device which transmits/receives information by wireless communication and a weak radio wave communication device which transmits/receives information by wireless communication of weak transmission power smaller than the transmission power of the mobile terminal device are present, and transmits/receives information by wireless communication, the base station device comprising a transmission clear message transmitting unit which transmits a special transmission clear message including a receiving address, which cannot exist in the utilization environment, and transmission planned time to other base station device when receiving a communication requesting message including a transmission node address, which cannot exist in the utilization environment, from the weak radio wave communication device and a transmission operation prohibiting unit which prohibits transmission operation for the transmission planned time in the message when receiving the special transmission clear message.

14. A wireless communication system comprising a base station device which is fixedly installed in a utilization environment of a wireless network and transmits/receives information by wireless communication;

a mobile terminal device which moves in the utilization environment and transmits/receives information by wireless communication; and a weak radio wave communication device which is disposed in a dispersed manner in the utilization environment and transmits/receives information by wireless communication of weak transmission power smaller than the transmission power of the base station device and the mobile terminal device; wherein, in the weak radio wave communication device, a message transmitting unit which increases the transmission power so as to transmit a special transmission clear message including a receiving address, which cannot exist in the utilization environment, and transmission planned time and then transmits predetermined information to the mobile terminal device is provided; and, in the base station device, a transmission operation prohibiting unit which prohibits transmission operation for the transmission planned time in the message when receiving the transmission clear message is provided.

15. A weak radio wave communication device which is a device which is disposed in a dispersed manner in a utilization environment of a wireless network, in which a base station device which transmits/receives information by wireless communication and a mobile terminal device which transmits/receives information by wireless communication are present, and transmits/receives information by wireless communication of weak transmission power smaller than the transmission power of the base station device and the mobile terminal device, the weak radio wave communication device comprising a message transmitting unit which increases the transmission power when approach of the mobile terminal device is detected, transmits a special transmission clear message including a receiving address, which cannot exist in the utilization environment, and transmission planned time and transmits information, which is determined in advance to the mobile terminal device while prohibiting transmission operation of the base station device for the transmission planned time in the message.

* * * * *